US008989468B2

(12) United States Patent
Binnig et al.

(10) Patent No.: US 8,989,468 B2
(45) Date of Patent: Mar. 24, 2015

(54) GENERATING AN ANATOMICAL MODEL USING A RULE-BASED SEGMENTATION AND CLASSIFICATION PROCESS

(75) Inventors: Gerd Binnig, Kottgeisering (DE); Guenter Schmidt, Munich (DE)

(73) Assignee: Definiens AG, Munich (DE)

( * ) Notice: Subject to any disclaimer, the term of this patent is extended or adjusted under 35 U.S.C. 154(b) by 2431 days.

(21) Appl. No.: 11/807,096

(22) Filed: May 25, 2007

(65) Prior Publication Data

US 2008/0292153 A1 Nov. 27, 2008

(51) Int. Cl.
*G06K 9/00* (2006.01)
*G06T 7/00* (2006.01)

(52) U.S. Cl.
CPC ........... *G06T 7/0012* (2013.01); *G06T 2200/24* (2013.01); *G06T 2207/20108* (2013.01); *G06T 2207/30004* (2013.01)
USPC ....................................................... 382/131

(58) Field of Classification Search
USPC ......... 382/128, 129, 130, 131, 159, 181, 194, 382/224, 226, 227; 707/723, 726, 728, 731; 378/4, 21
See application file for complete search history.

(56) References Cited

U.S. PATENT DOCUMENTS

| | | | |
|---|---|---|---|
| 4,922,432 A | 5/1990 | Kobayashi et al. | 364/490 |
| 5,170,347 A | 12/1992 | Tuy et al. | 364/413.22 |
| 5,297,215 A | 3/1994 | Yamagishi | 382/6 |
| 5,331,554 A | 7/1994 | Graham | 364/419.07 |
| 5,383,472 A | 1/1995 | Devlin et al. | 128/771 |
| 5,579,393 A | 11/1996 | Conner et al. | 380/25 |
| 5,870,493 A | 2/1999 | Vogl et al. | 382/195 |
| 5,966,701 A | 10/1999 | Kohda et al. | 706/20 |
| 5,983,210 A | 11/1999 | Imasaki et al. | 706/15 |
| 6,058,206 A | 5/2000 | Kortge | 382/159 |
| 6,757,665 B1 | 6/2004 | Unsworth et al. | 706/15 |
| 6,778,705 B2 | 8/2004 | Gutta et al. | 382/224 |
| 7,043,063 B1 | 5/2006 | Noble et al. | 382/128 |
| 7,058,210 B2 | 6/2006 | Mundy et al. | 382/128 |

(Continued)

OTHER PUBLICATIONS

Karssemeijer et al (Recognition of Organs in CT-image Sequences: A Model Guided Approach, Laboratory of Medical Physics and Biophysics, University of Nijmegen. and Department of Diagnostic Radiology, St. Radboud University Hospital, Nijmegen, The Netherlands, Oct. 15, 1987.*

(Continued)

*Primary Examiner* — Shervin Nakhjavan
(74) *Attorney, Agent, or Firm* — Imperium Patent Works; Darien K. Wallace

(57) ABSTRACT

A system for computer-aided detection uses a computer-implemented network structure to analyze patterns present in digital image slices of a human body and to generate a three-dimensional anatomical model of a patient. The anatomical model is generated by detecting easily identifiable organs first and then using those organs as context objects to detect other organs. A user specifies membership functions that define which objects of the network structure belong to the various classes of human organs specified in a class hierarchy. A membership function of a potentially matching class determines whether a candidate object of the network structure belongs to the potential class based on the relation between a property of the voxels linked to the candidate object and a property of the context object. Some voxel properties used to classify an object are location, brightness and volume. The human organs are then measured to assist in the patient's diagnosis.

9 Claims, 22 Drawing Sheets

(56) References Cited

U.S. PATENT DOCUMENTS

| | | | |
|---|---|---|---|
| 7,130,457 B2 | 10/2006 | Kaufman et al. | 382/128 |
| 7,203,354 B2 | 4/2007 | Wilson et al. | 382/131 |
| 7,221,787 B2 | 5/2007 | Luo et al. | 382/132 |
| 7,437,004 B2 | 10/2008 | Baatz et al. | 382/224 |
| 7,533,406 B2 | 5/2009 | Ludvig et al. | 725/110 |
| 7,840,051 B2* | 11/2010 | Razeto | 382/131 |
| 2001/0031920 A1* | 10/2001 | Kaufman et al. | 600/431 |
| 2002/0030811 A1 | 3/2002 | Schindler | 356/318 |
| 2002/0041328 A1 | 4/2002 | LeCompte et al. | 348/144 |
| 2002/0188436 A1 | 12/2002 | Schmidt et al. | 704/1 |
| 2002/0191823 A1* | 12/2002 | Wehrli et al. | 382/128 |
| 2003/0016869 A1 | 1/2003 | Laumeyer et al. | 382/190 |
| 2003/0035773 A1 | 2/2003 | Tottermann et al. | 424/9.1 |
| 2003/0223627 A1* | 12/2003 | Yoshida et al. | 382/128 |
| 2006/0277073 A1* | 12/2006 | Heilbrunn et al. | 705/3 |
| 2007/0081702 A1* | 4/2007 | Porat et al. | 382/128 |
| 2007/0237373 A1* | 10/2007 | Kiraly et al. | 382/128 |
| 2008/0008349 A1 | 1/2008 | Binnig et al. | 382/100 |
| 2008/0008367 A1* | 1/2008 | Franaszek et al. | 382/128 |
| 2010/0086185 A1* | 4/2010 | Weiss | 382/131 |

OTHER PUBLICATIONS

Schönmeyer R. et al., "Automated segmentation of lateral ventricles from human and primate magnetic resonance images using cognition network technology," Magnetic Resonance Imaging, vol. 24 Dec. 1, 2006 Elsevier Science, Tarrytown NY pp. 1377-1387 XP025145528.

Athelogou M. et al., "Cognition Network Technology—A Novel Multimodal Image Analysis Technique for Automatic Identification and Quantification of Biological Image Contents," Imaging Cellular and Molecular Biological Functions, Apr. 2007 Springer, Berlin Heidelberg pp. 407-422 XP008121918.

Brown et al., "Method for Segmenting Chest CT Image Data Using an Anatomical Model: Preliminary Results," IEEE Transactions on Medical Imaging, IEEE Service Center, Piscataway, NJ, US, vol. 16, No. 6 Dec. 1, 1997 ISSN: 0278-0062 pp. 828-839 (12 pages).

Dellepiane et al., "Model Generation and Model Matching of Real Images by a Fuzzy Approach," 1023 Pattern Recognition, vol. 25, Feb. 1992 XP000263519 pp. 115-137 (22 pages).

Camara et al., "Computational modeling of thoracic and abdominal anatomy using spatial relationships for image segmentation," Real-Time Imaging, vol. 10, Sep. 11, 2004 pp. 263-273 available at www.sciencedirect.com (12 pages).

EPO Office action in related European application EP11151560.7 dated Apr. 5, 2013 (6 pages).

Kalinin et al., "A Classification Approach for Anatomical Regions Segmentation", DePaul Univ. and Northwestern Univ., Chicago, IL, date after Dec. 2004 unknown (4 pages).

Varshney, Lav R., "Abdominal Organ Segmentation in CT Scan Images: A Survery", Cornell Univ., Ithaca, NY, Aug. 5, 2002 (4 pages).

Xu et al., "Preliminary Development of a 4D anatomical Model for Monte Carlo Simulations", Rensselaer Polytech., Tory, NY and Univ. of Arkansas, Little Rock, AR, published in "The Monte Carlo Method: Versatility Unbounded in a Dynamic Computing World", Apr. 17, 2005, American Nuclear Society (10 pages).

\* cited by examiner

```xml
<?xml version="1.0" encoding="UTF-8" ?>
- <eCog.Proc UserName="Gerd" Company="Definiens AG" Copyright="" version="20050718" use-reproducable-
    poly="1" NumLvl="4" project-unit="1" engine-version="5.5.0" engine-build="534">
    <!-- Image layers are specified below -->
    + <ImgLayers>
    <!-- Thematic layers are specified below -->
    + <ThmLayers>
    <!-- Map layers are specified below -->
    + <MapLvlProxyCntnr>
    <ParamValueSetCntnr />
    <!-- Variables for process steps are specified below -->
    + <ProcVrblCntnr>
    <!-- Below are the classes of the class network; see, e.g., class network 13 in FIG. 2
      -->
    + <ClssHrchy EvalInvalid="1" MinProb="0.10000000000000001" NNSlope="0.20000000000000001"
        PrjctBaseUnit="1" NumGisChnl="1">
    <!-- Below are samples for training the detection and analysis system -->
    + <Smpls>
    + <CustProcAlgrList>
    <!-- Below are process steps of the process hierarchy; see, e.g., process hierarchy 14
    of FIG. 2 -->
    - <ProcessList>
        <!-- Below is the root process step 68 of the method of detecting lymph nodes of
        FIG. 10 -->
        - <ProcBase Name="Lymph Nodes MM" bLoopChg="0" iMaxCycle="1" bExpand="1" bActive="1"
            bAutoName="0" sComment="">
            <LcnsInfo tLcnsId="0" sPwd="" />
            + <Algorithm guid="A8BA5775-CC39-4194-9A6A-A64872EE1F81">
            + <Domain>
            - <SubProc>
                + <ProcBase Name="PARAMETERS" bLoopChg="0" iMaxCycle="1" bExpand="0" bActive="1"
                    bAutoName="0" sComment="">
                + <ProcBase Name="Filters, Bins, Levels" bLoopChg="0" iMaxCycle="1" bExpand="0"
                    bActive="1" bAutoName="0" sComment="">
                + <ProcBase Name="Fragments" bLoopChg="0" iMaxCycle="1" bExpand="0" bActive="1"
                    bAutoName="0" sComment="">
                + <ProcBase Name="LINKING of LNs" bLoopChg="0" iMaxCycle="1" bExpand="0" bActive="1"
                    bAutoName="0" sComment="">
                + <ProcBase Name="RESERVE" bLoopChg="0" iMaxCycle="1" bExpand="0" bActive="0"
                    bAutoName="0" sComment="">
                + <ProcBase Name="Customized Algorithms" bLoopChg="0" iMaxCycle="1" bExpand="0"
                    bActive="0" bAutoName="0" sComment="">
            </SubProc>
        </ProcBase>
    </ProcessList>
    <ExportedItems />
    <LcnsIds />
    + <Behaviour>
</eCog.Proc>
```

FIG. 20

```xml
<?xml version="1.0" encoding="UTF-8" ?>
- <eCog.Proc UserName="Gerd" Company="Definiens AG" Copyright="" version="20050718" use-reproducable-poly="1"
    NumLvl="4" project-unit="1" engine-version="5.5.0" engine-build="534">
    <!-- Image layers are specified below -->
  + <ImgLayers>
    <!-- Thematic layers are specified below -->
  + <ThmLayers>
    <!-- Map layers are specified below -->
  + <MapLvlProxyCntnr>
    <ParamValueSetCntnr />
    <!-- Variables for process steps are specified below -->
  + <ProcVrblCntnr>
    <!-- Below are the classes of the class network; see, e.g., class network 13 in FIG. 2 -->
  + <ClssHrchy EvalInvalid="1" MinProb="0.100000000000000001" NNSlope="0.2000000000000000001"
      PrjctBaseUnit="1" NumGisChnl="1">
    <!-- Below are samples for training the detection and analysis system -->
  + <Smpls>
  + <CustProcAlgrList>
    <!-- Below are process steps of the process hierarchy; see, e.g., process hierarchy 14 of FIG. 2
      -->
  - <ProcessList>
      <!-- Below is the root process step 68 of the method of detecting lymph nodes of FIG. 10 --
      >
    - <ProcBase Name="Lymph Nodes MM" bLoopChg="0" iMaxCycle="1" bExpand="1" bActive="1" bAutoName="0"
        sComment="">
        <LcnsInfo tLcnsId="0" sPwd="" />
      + <Algorithm guid="A8BA5775-CC39-4194-9A6A-A64872EE1F81">
      + <Domain>
      - <SubProc>
        + <ProcBase Name="PARAMETERS" bLoopChg="0" iMaxCycle="1" bExpand="0" bActive="1"
            bAutoName="0" sComment="">
        - <ProcBase Name="Filters, Bins, Levels" bLoopChg="0" iMaxCycle="1" bExpand="0" bActive="1"
            bAutoName="0" sComment="">
            <LcnsInfo tLcnsId="0" sPwd="" />
          + <Algorithm guid="A8BA5775-CC39-4194-9A6A-A64872EE1F81">
          + <Domain>
          - <SubProc>
            - <ProcBase Name="Background-BIN, Gauss & Edge" bLoopChg="0" iMaxCycle="1"
                bExpand="0" bActive="1" bAutoName="0" sComment="">
                <LcnsInfo tLcnsId="0" sPwd="" />
              + <Algorithm guid="A8BA5775-CC39-4194-9A6A-A64872EE1F81">
              + <Domain>
              - <SubProc>
                + <ProcBase Name="DO NOT delete" bLoopChg="0" iMaxCycle="1" bExpand="0"
                    bActive="0" bAutoName="0" sComment="SAVE BIN-Classes">
                + <ProcBase Name="*Binned them layer[1]" bLoopChg="0" iMaxCycle="1" bExpand="1"
                    bActive="1" bAutoName="1" sComment="BINs by mean - Background, LN, Bone,    97
                    Vessel">
                + <ProcBase Name="Gauss 3d filter Layer 1 -> Edge[3,3] if Binned them
                    layer/X#1" bLoopChg="0" iMaxCycle="1" bExpand="1" bActive="1" bAutoName="1"
                    sComment="">
                + <ProcBase Name="Median 3d filter Edge -> Gauss[3,3] if Binned them
                    layer/X#1" bLoopChg="0" iMaxCycle="1" bExpand="1" bActive="1" bAutoName="1"
                    sComment="">
                + <ProcBase Name="Edge 3d filter Gauss -> Edge[3,3] if Binned them layer/X#1"
                    bLoopChg="0" iMaxCycle="1" bExpand="1" bActive="1" bAutoName="1" sComment="">
                </SubProc>
              </ProcBase>
            + <ProcBase Name="BINs & more" bLoopChg="0" iMaxCycle="1" bExpand="1" bActive="1"
                bAutoName="0" sComment="">
            </SubProc>                                                                            98
          </ProcBase>
        - <ProcBase Name="Fragments" bLoopChg="0" iMaxCycle="1" bExpand="0" bActive="1" bAutoName="0"
            sComment="">
            <LcnsInfo tLcnsId="0" sPwd="" />
          + <Algorithm guid="A8BA5775-CC39-4194-9A6A-A64872EE1F81">
          + <Domain>
          - <SubProc>
```

FIG. 21A

```
- <SubProc>
    + <ProcBase Name="First Classification" bLoopChg="0" iMaxCycle="1" bExpand="0" bActive="1"
        bAutoName="0" sComment="">
    - <ProcBase Name="Context Lungs" bLoopChg="0" iMaxCycle="1" bExpand="0" bActive="1"
        bAutoName="0" sComment="">
        <LcnsInfo tLcnsId="0" sPwd="" />
      + <Algorithm guid="A8BA5775-CC39-4194-9A6A-A64872EE1F81">
      + <Domain>
      - <SubProc>
            <!-- Below is a process step for detecting bones; see, e.g., item 73 in
            FIG. 10  -->
          + <ProcBase Name="Best Vessel, Breastbone, Middle bone, Spine at Level 1: bone"
              bLoopChg="0" iMaxCycle="1" bExpand="1" bActive="0" bAutoName="1" sComment="">
          + <ProcBase Name="bounding box for LN between Lungs" bLoopChg="0" iMaxCycle="1"
              bExpand="0" bActive="1" bAutoName="0" sComment="">
          + <ProcBase Name="Spine and Breastbone" bLoopChg="0" iMaxCycle="1" bExpand="0"
              bActive="1" bAutoName="0" sComment="">
          + <ProcBase Name="Aorta" bLoopChg="0" iMaxCycle="1" bExpand="0" bActive="1"
              bAutoName="0" sComment="">
          + <ProcBase Name="spine" bLoopChg="0" iMaxCycle="1" bExpand="0" bActive="0"
              bAutoName="0" sComment="">
          + <ProcBase Name="grow tissue" bLoopChg="0" iMaxCycle="1" bExpand="0" bActive="1"
              bAutoName="0" sComment="">
          + <ProcBase Name="grow Spine" bLoopChg="0" iMaxCycle="1" bExpand="0" bActive="1"
              bAutoName="0" sComment="">
          + <ProcBase Name="Spinal Cord" bLoopChg="0" iMaxCycle="1" bExpand="0" bActive="1"
              bAutoName="0" sComment="">
          + <ProcBase Name="Luftröhre" bLoopChg="0" iMaxCycle="1" bExpand="0" bActive="1"
              bAutoName="0" sComment="">
          - <ProcBase Name="Gullet" bLoopChg="0" iMaxCycle="1" bExpand="0" bActive="1"
              bAutoName="0" sComment="">
              <LcnsInfo tLcnsId="0" sPwd="" />
            + <Algorithm guid="A8BA5775-CC39-4194-9A6A-A64872EE1F81">
            + <Domain>
            - <SubProc>
                + <ProcBase Name="rename image object level 'Level 1' to
                    'seeds'" bLoopChg="0" iMaxCycle="1" bExpand="1" bActive="1"
                    bAutoName="1" sComment="">
                + <ProcBase Name="Speiseröhre" bLoopChg="0" iMaxCycle="1" bExpand="0"
                    bActive="1" bAutoName="0" sComment="">
                + <ProcBase Name="rename image object level 'seeds' to
                    'Level 1'" bLoopChg="0" iMaxCycle="1" bExpand="1"
                    bActive="1" bAutoName="1" sComment="">
                + <ProcBase Name="re-merge" bLoopChg="0" iMaxCycle="1" bExpand="0"
                    bActive="1" bAutoName="0" sComment="">
                    <!-- Below is a process step for detecting the esophagus and
                    trachea  -->
                + <ProcBase Name="Gullet with Luftröhre" bLoopChg="0" iMaxCycle="1"
                    bExpand="0" bActive="1" bAutoName="0" sComment="">
                </SubProc>
            </ProcBase>
          + <ProcBase Name="expand objects into edge" bLoopChg="0" iMaxCycle="1"
              bExpand="0" bActive="1" bAutoName="0" sComment="">
        </SubProc>
    </ProcBase>
```

FIG. 21B

```xml
+ <ProcBase Name="Prepare LNs" bLoopChg="0" iMaxCycle="1" bExpand="0" bActive="1"
    bAutoName="0" sComment="">
+ <ProcBase Name="CONTINUE" bLoopChg="0" iMaxCycle="1" bExpand="0" bActive="1"
    bAutoName="0" sComment="">
+ <ProcBase Name="New Levels" bLoopChg="0" iMaxCycle="1" bExpand="0" bActive="1"
    bAutoName="0" sComment="">
  </SubProc>
  </ProcBase>
+ <ProcBase Name="LINKING of LNs" bLoopChg="0" iMaxCycle="1" bExpand="0" bActive="1"
    bAutoName="0" sComment="">
- <ProcBase Name="RESERVE" bLoopChg="0" iMaxCycle="1" bExpand="0" bActive="0" bAutoName="0"
    sComment="">
    <LcnsInfo tLcnsId="0" sPwd="" />
+   <Algorithm guid="A8BA5775-CC39-4194-9A6A-A64872EE1F81">
+   <Domain>
-   <SubProc>
    + <ProcBase Name="grow confidence" bLoopChg="0" iMaxCycle="1" bExpand="0" bActive="1"
        bAutoName="0" sComment="">
    + <ProcBase Name="for all" bLoopChg="0" iMaxCycle="1" bExpand="0" bActive="1"
        bAutoName="1" sComment="">
    + <ProcBase Name="for all" bLoopChg="0" iMaxCycle="1" bExpand="0" bActive="1"
        bAutoName="1" sComment="">
    + <ProcBase Name="for all" bLoopChg="0" iMaxCycle="1" bExpand="0" bActive="1"
        bAutoName="1" sComment="">
    + <ProcBase Name="Linking" bLoopChg="0" iMaxCycle="1" bExpand="0" bActive="1"
        bAutoName="0" sComment="">
    + <ProcBase Name="Linking" bLoopChg="0" iMaxCycle="1" bExpand="0" bActive="1"
        bAutoName="0" sComment="">
    + <ProcBase Name="active 2 at Level 1: Lymph Node" bLoopChg="0" iMaxCycle="1"
        bExpand="1" bActive="1" bAutoName="1" sComment="">
    + <ProcBase Name="3D end LN, 3D end lower, 3D end upper, finished at Level 1: Lymph
        Node" bLoopChg="0" iMaxCycle="1" bExpand="1" bActive="1" bAutoName="1" sComment="">
    + <ProcBase Name="Shape LNs" bLoopChg="0" iMaxCycle="1" bExpand="0" bActive="1"
        bAutoName="0" sComment="">
    - <ProcBase Name="RESERVE" bLoopChg="0" iMaxCycle="1" bExpand="0" bActive="1"
        bAutoName="0" sComment="">
      <LcnsInfo tLcnsId="0" sPwd="" />
      + <Algorithm guid="A8BA5775-CC39-4194-9A6A-A64872EE1F81">
      + <Domain>
      - <SubProc>
        + <ProcBase Name="Levels seeds and others" bLoopChg="0" iMaxCycle="1" bExpand="0"
            bActive="1" bAutoName="0" sComment="">
        + <ProcBase Name="First 3D" bLoopChg="0" iMaxCycle="1" bExpand="0" bActive="0"
            bAutoName="0" sComment="">
        + <ProcBase Name="for all" bLoopChg="0" iMaxCycle="1" bExpand="0" bActive="0"
            bAutoName="1" sComment="">
        + <ProcBase Name="Shrink in 3D" bLoopChg="0" iMaxCycle="1" bExpand="0" bActive="1"
            bAutoName="0" sComment="">
        + <ProcBase Name="chess board: 512 creating 'seeds'" bLoopChg="0"
            iMaxCycle="1" bExpand="1" bActive="1" bAutoName="1" sComment="">
        + <ProcBase Name="for all" bLoopChg="0" iMaxCycle="1" bExpand="0" bActive="0"
            bAutoName="1" sComment="">
        + <ProcBase Name="Distance to object border for form" bLoopChg="0" iMaxCycle="1"
            bExpand="0" bActive="0" bAutoName="0" sComment="">
        + <ProcBase Name="classify" bLoopChg="0" iMaxCycle="1" bExpand="0" bActive="1"
            bAutoName="0" sComment="">
        + <ProcBase Name="Context Lungs" bLoopChg="0" iMaxCycle="1" bExpand="0"
            bActive="1" bAutoName="0" sComment="">
```

FIG. 21C

```xml
<!-- Below is a process step in which the lungs are used as a context
     object to detect other anatomical objects; see, e.g., process step 70 in FIG. 10 -->
+ <ProcBase Name="Context Lungs" bLoopChg="0" iMaxCycle="1" bExpand="0"
     bActive="1" bAutoName="0" sComment="">
+ <ProcBase Name="3D by overlap" bLoopChg="0" iMaxCycle="1" bExpand="0"
     bActive="1" bAutoName="0" sComment="">
+ <ProcBase Name="for all" bLoopChg="0" iMaxCycle="1" bExpand="0" bActive="0"
     bAutoName="1" sComment="">
+ <ProcBase Name="classify" bLoopChg="0" iMaxCycle="1" bExpand="0" bActive="1"
     bAutoName="0" sComment="">
+ <ProcBase Name="Context Lungs" bLoopChg="0" iMaxCycle="1" bExpand="0"
     bActive="1" bAutoName="0" sComment="">
+ <ProcBase Name="swallow holes" bLoopChg="0" iMaxCycle="1" bExpand="0"
     bActive="0" bAutoName="0" sComment="">
+ <ProcBase Name="Form" bLoopChg="0" iMaxCycle="1" bExpand="0" bActive="1"
     bAutoName="0" sComment="">
- <ProcBase Name="3D" bLoopChg="0" iMaxCycle="1" bExpand="0" bActive="0"
     bAutoName="0" sComment="">
     <LcnsInfo tLcnsId="0" sPwd="" />
  + <Algorithm guid="A8BA5775-CC39-4194-9A6A-A64872EE1F81">
  + <Domain>
  - <SubProc>
    + <ProcBase Name="for all" bLoopChg="0" iMaxCycle="1" bExpand="0"
         bActive="0" bAutoName="1" sComment="">
    + <ProcBase Name="for all" bLoopChg="0" iMaxCycle="1" bExpand="0"
         bActive="1" bAutoName="1" sComment="">
    - <ProcBase Name="for all" bLoopChg="0" iMaxCycle="1" bExpand="0"
         bActive="1" bAutoName="1" sComment="">
         <LcnsInfo tLcnsId="0" sPwd="" />
      + <Algorithm guid="A8BA5775-CC39-4194-9A6A-A64872EE1F81">
      + <Domain>
      - <SubProc>
        + <ProcBase Name="Aorta at seeds: SEED" bLoopChg="0" iMaxCycle="1"
             bExpand="1" bActive="1" bAutoName="1" sComment="">
        + <ProcBase Name="01, 02, 03 at fragments: unclassified"
             bLoopChg="0" iMaxCycle="1" bExpand="1" bActive="1"
             bAutoName="1" sComment="">
        + <ProcBase Name="unclassified with Mean Edge >= 990 at
             fragments: 01" bLoopChg="0" iMaxCycle="1" bExpand="1"
             bActive="1" bAutoName="1" sComment="">
        + <ProcBase Name="unclassified with Mean Edge_tmp >= 990 at
             fragments: 02" bLoopChg="0" iMaxCycle="1" bExpand="1"
             bActive="1" bAutoName="1" sComment="">
        + <ProcBase Name="unclassified with Mean Gauss >= 990 at
             fragments: 03" bLoopChg="0" iMaxCycle="1" bExpand="1"
             bActive="1" bAutoName="1" sComment="">
        - <ProcBase Name="SEED with Mean Edge > 880 at seeds: for all"
             bLoopChg="0" iMaxCycle="1" bExpand="1" bActive="1"
             bAutoName="1" sComment="">
             <LcnsInfo tLcnsId="0" sPwd="" />
          + <Algorithm guid="A8BA5775-CC39-4194-9A6A-A64872EE1F81">
          + <Domain>
          - <SubProc>
            - <ProcBase Name="if with Rel. area of sub objects 01 (1) >
                 0.75" bLoopChg="0" iMaxCycle="1" bExpand="1" bActive="1"
                 bAutoName="1" sComment="">
                 <LcnsInfo tLcnsId="0" sPwd="" />
              + <Algorithm guid="A8BA5775-CC39-4194-9A6A-
                   A64872EE1F81">
              + <Domain>
              - <SubProc>
                   <!-- Below is a process step for detecting the
                        aorta; see, e.g., item 75 in FIG. 10 -->
                + <ProcBase Name="if with Classification value of
                     Aorta > 0.5 : Aorta" bLoopChg="0" iMaxCycle="1"
                     bExpand="1" bActive="1" bAutoName="1"
                     sComment="">
              </SubProc>
           </ProcBase>
```

FIG. 21D

```
              </ProcBase>
            </SubProc>
          </ProcBase>
        </SubProc>
      </ProcBase>
    + <ProcBase Name="at fragments: delete" bLoopChg="0" iMaxCycle="1"
        bExpand="1" bActive="1" bAutoName="1" sComment="">
    + <ProcBase Name="Lymph Node, unclassified with Mean Edge > 900 at
        seeds: SEED" bLoopChg="0" iMaxCycle="1" bExpand="1" bActive="1"
        bAutoName="1" sComment="">
    + <ProcBase Name="SEED at seeds: for all" bLoopChg="0" iMaxCycle="1"
        bExpand="0" bActive="1" bAutoName="1" sComment="">
    + <ProcBase Name="Lymph Node with Area < 24 m² at seeds: for all"
        bLoopChg="0" iMaxCycle="1" bExpand="0" bActive="1" bAutoName="1"
        sComment="">
    + <ProcBase Name="Lymph Node with Area < 18 m² at seeds: for all"
        bLoopChg="0" iMaxCycle="1" bExpand="0" bActive="1" bAutoName="1"
        sComment="">
    + <ProcBase Name="loop: Lymph Node at seeds: all Mean Edge < 1"
        bLoopChg="1" iMaxCycle="1" bExpand="1" bActive="1" bAutoName="1"
        sComment="">
    + <ProcBase Name="loop: Lymph Node at seeds: all Mean Edge < 1"
        bLoopChg="1" iMaxCycle="1" bExpand="1" bActive="1" bAutoName="1"
        sComment="">
    + <ProcBase Name="loop: potential LN at seeds: all Mean Edge < 1"
        bLoopChg="1" iMaxCycle="1" bExpand="1" bActive="1" bAutoName="1"
        sComment="">
    + <ProcBase Name="loop: SEED at seeds: all Mean Edge < 1" bLoopChg="1"
        iMaxCycle="1" bExpand="1" bActive="1" bAutoName="1" sComment="">
    + <ProcBase Name="SEED at seeds: Lymph Node" bLoopChg="0" iMaxCycle="1"
        bExpand="0" bActive="0" bAutoName="1" sComment="">
      </SubProc>
    </ProcBase>
    + <ProcBase Name="growth from seed with surface tension" bLoopChg="0"
        iMaxCycle="1" bExpand="0" bActive="0" bAutoName="0" sComment="">
    + <ProcBase Name="First Growth UP" bLoopChg="0" iMaxCycle="1" bExpand="0"
        bActive="1" bAutoName="0" sComment="">
    + <ProcBase Name="n = max shot Nr" bLoopChg="0" iMaxCycle="1" bExpand="1"
        bActive="1" bAutoName="1" sComment="">
    + <ProcBase Name="for all" bLoopChg="0" iMaxCycle="1" bExpand="0" bActive="1"
        bAutoName="1" sComment="">
      </SubProc>
    </ProcBase>
  + <ProcBase Name="Linking" bLoopChg="0" iMaxCycle="1" bExpand="0" bActive="1"
      bAutoName="0" sComment="">
  + <ProcBase Name="Next" bLoopChg="0" iMaxCycle="1" bExpand="0" bActive="1" bAutoName="0"
      sComment="">
  + <ProcBase Name="Linking on level 2" bLoopChg="0" iMaxCycle="1" bExpand="0" bActive="0"
      bAutoName="0" sComment="">
  + <ProcBase Name="SEEDS and CLUSTERS" bLoopChg="0" iMaxCycle="1" bExpand="0"
      bActive="1" bAutoName="0" sComment="">
    </SubProc>
  </ProcBase>
  + <ProcBase Name="Customized Algorithms" bLoopChg="0" iMaxCycle="1" bExpand="0" bActive="0"
      bAutoName="0" sComment="">
  </SubProc>
 </ProcBase>
</ProcessList>
<ExportedItems />
<LcnsIds />
+ <Behaviour>
</eCog.Proc>
```

FIG. 21E

KEY TO FIG. 21

GENERATING AN ANATOMICAL MODEL USING A RULE-BASED SEGMENTATION AND CLASSIFICATION PROCESS

TECHNICAL FIELD

The present invention relates generally to locating specified image structures in digital image slices, and more specifically to a computer-implemented system for automatically generating an anatomical model of human organs.

CROSS REFERENCE TO COMPACT DISC APPENDIX

The Compact Disc Appendix, which is a part of the present disclosure, is one recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

Systems for detecting and analyzing target patterns in digital imagery have a wide variety of uses. Such systems can be used to detect airplanes, ships, submarines and even schools of fish using radar and sonar. Pattern recognition systems are also used to detect geographical objects, military targets and weather patterns from satellite images. Conventional pattern recognition systems use a template of the object that is to be detected. For example, a satellite image of the ocean is searched for an object that matches a template of a particular ship.

An increasingly important area is the detection and analysis of anatomical regions in the human body. For example, radiological images from computed tomography (CT) are used for the computer-aided detection (CAD) of various ailments in human organs. Images from magnetic resonance imaging (MRI) are also used in computer-aided detection. For the detection and diagnosis of the ailments in one human organ, it is often helpful to identify the surrounding organs as well. Consequently, an "anatomical model" of a patient is generated in which many of the patient's internal organs are identified on digital image slices of the patient.

Conventionally, pixels in multiple digital image slices are compared to a three-dimensional template of a target organ that is to be detected. The pixels that are associated with the target organ are identified based on their properties, such as brightness. The templates of the target organs are expanded, contracted and generally modified in order to obtain a match with a three-dimensional object in the digital image slices. After a match is found, the conventional pattern recognition system fills out the organ by growing the identified boundary of the organ into pixels having a similar brightness or texture. For each digital image slice, the mask is placed in the appropriate region using expert knowledge so that the desired organ can be identified. A conventional pixel-based pattern recognition system generates anatomical models only with the supervision of an expert and, therefore, has several disadvantages. First, the interactive guidance of an expert is costly and not always available. Second, the accuracy of detecting particular organs depends on the knowledge of the particular expert, and inconsistent results are obtained. Third, the rules by which an organ boundary is made to grow into pixels with similar properties do not apply equally well to images acquired using different machines that might have variations in the thickness of the digital image slices, as well as different picture qualities and variations in pixel brightness. Finally, a conventional pattern recognition system identifies each organ independently by matching an object in an image to a template and does not use the relationships between the organs for the recognition except through the interactive guidance of an expert.

An improved CAD scheme is sought for automatically generating an anatomical model of a patient without the manual application of expert knowledge. Moreover, such an improved CAD scheme would use the relationships between organs to identify those organs and to generate an anatomical model.

SUMMARY

A Cognition Program running on a detection and analysis system performs computer-aided detection (CAD) of human organs to generate an anatomical model of a person.

In a specification mode, the user of the detection system specifies the classes of a class network and the process steps of a process hierarchy. The user specifies membership functions that determine whether an object belongs to a particular class. The classes and subclasses of the class network correspond to anatomical objects that the user expects to find in digital image slices of a patient for whom an anatomical model is to be generated.

In an execution mode, the detection system acquired the digital image slices of the patient. The digital image slices are acquired using an imaging machine. The detection system generates image layers and thematic layers from the digital image slices. Pixel locations of the image layers are linked to objects of an object network. The detection system then generates a computer-implemented network structure in which classes of the class network, process steps of the process hierarchy and objects of the data network are interlinked. Through an iterative process, the objects of the object network are linked to the best-fitting classes of the class network. The anatomical model is generated by first detecting easily identifiable organs of the patient and then using those organs as context objects to detect other organs.

In one embodiment, in the specification mode, the user of the detection and analysis system specifies a first process step and a second process step of a process hierarchy. The user also specifies a first class and a second class of a class network, wherein each class is associated with a particular anatomical object. The second class is specified according to a relation between objects in the second class and objects in the first class.

In the execution mode, the detection system performs the first process step using the first class to detect the first anatomical object. Then the detection system performs the second process step and detects the second anatomical object using both the second class and the detection of the first anatomical object. The detected the second anatomical object is then measured.

In another embodiment, a computer-implemented network structure comprises a data network, a class network, a process hierarchy and a file system. The data network includes a first and second set of voxel values that are part of a digital image slice of a human body. Each of the first set of voxel values is linked to a first object of the object network, and each of the second set of voxel values is linked to a second object of the object network. The first object exhibits a first property that depends on the first set of voxel values, and the second object exhibits a second property that depends on the second set of voxel values.

The class network includes first and second classes. A first membership function associated with the first class determines that the first object belongs to the first class. A second membership function associated with the second class determines that the second object belongs to the second class based on a relation between the first property and the second property. The process hierarchy includes first and second process steps. The first process step designates the first class, and the second process step designates the second class. The first process step is performed before the second process step is performed. An algorithm of the second process step measures the second property, and the second property is then stored in the file system.

In yet another embodiment, a computer-implemented network structure comprises a data network, a class network and a process hierarchy. A digital image slice of a human body includes first and second voxel values. A first link links the first voxel value to a first object of the data network, and a second link links the second voxel value to a second object of the data network. A first process step of the process hierarchy determines that the first object belongs to a first class of the class network. Then a second process step determines that the second object belongs to a second class of the class network based on a relation between the second object and the first object. An algorithm of the second process step measures a property of the voxels that belong to the second class. In one aspect, the second process step defines a region of interest based on the first object. The second process step then determines that the second object belongs to the second class based on whether the voxels that belong to the second object are within the region of interest.

In yet another embodiment, a system includes a display and a means for identifying anatomical objects in a digital image. The digital image is a cross section of a human body and is displayed on the display. The means identifies a first anatomical object and a second anatomical object in the digital image based on a process hierarchy of process steps. The process hierarchy specifies that a first process step identifies the first anatomical object before a second process step identifies the second anatomical object. The second anatomical object is identified based on the identification of the first anatomical object.

In yet another embodiment, first, second and third classes of a class network are specified. In addition, first, second and third process steps of a process hierarchy are specified. Objects of an object network are classified by a first membership function as belonging to the first class, and by a second membership function as belonging to the second class. The first class is associated with a first human organ, the second class is associated with a second human organ, and the third class is associated with a third human organ.

The first process step detects the first human organ using the first membership function; the second process step detects the second human organ using the second membership function; and the third process step detects the third human organ using the third membership function. The third membership function classifies objects of the object network as belonging to the third class based on either a first relation between objects in the third class and objects in the first class or based on a second relation between objects in the third class and objects in the second class. The third membership function classifies objects based on the second relation when the second membership function determines a better fit for the objects classified as belonging to the second class than a fit determined by the first membership function for the objects classified as belonging to the first class.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 20 is a listing of high-level lines of XML code corresponding to a Cognition Language script that generates an anatomical model used to analyze lymph nodes.

FIGS. 21A-E show more lines of the XML code of FIG. 20.

DETAILED DESCRIPTION

Reference will now be made in detail to some embodiments of the invention, examples of which are illustrated in the accompanying drawings.

A system for computer-aided detection uses a computer-implemented network structure to analyze patterns present in the pixel values of digital image slices of a human body and then generates an anatomical model of that human body. The detection and analysis system includes a computer program that generates the network structure. The computer program is called the Cognition Program. The network structure is, in turn, used to generate the anatomical model. In one application, the human body is that of a patient whose lymph nodes are to be analyzed. Radiological images obtained from computed tomography (CT) scans of the patient are acquired and used to generate the computer-implemented network structure. The detection and analysis system then superimposes an indication of the various bodily organs over each digital image slice indicating the location of each organ. The digital image slices with the superimposed indications of the organs are then displayed as a three-dimensional anatomical model on a screen of the detection and analysis system.

Figure 1:
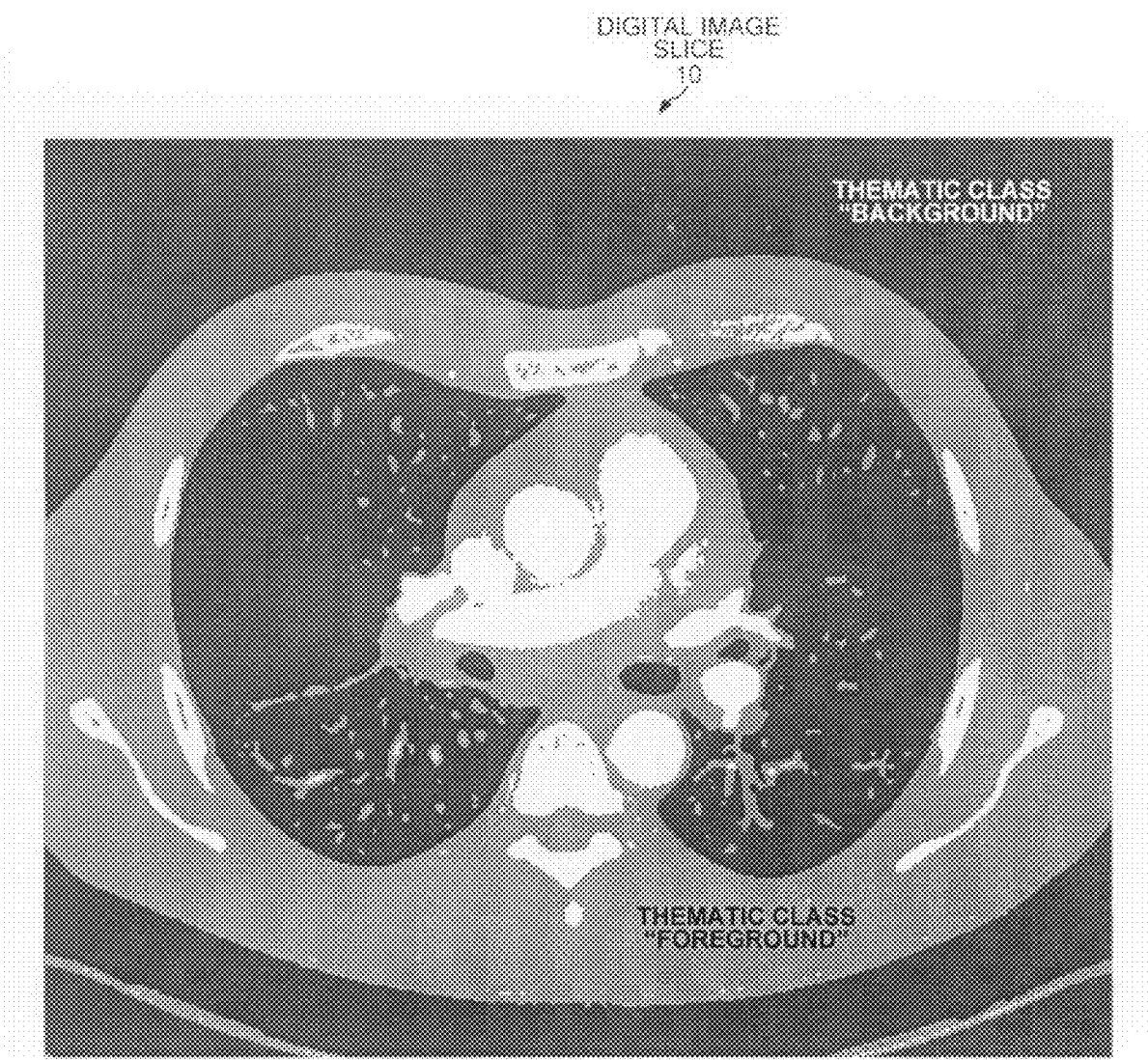
FIG. 1 is a digital image slice of the chest of a patient used to generate an anatomical model of the patient.

FIG. 1 is a digital image slice 10 taken in a craniocaudal orientation through the chest of the patient. Digital image slice 10 is one of a plurality of digital image slices used to generate an anatomical model of the patient. The pixel values of digital image slice 10 were acquired with a computed tomography (CT) device. In other embodiments, digital image slices are acquired using X-ray devices, ultrasound imaging devices, and magnetic resonance imaging (MRI) devices. The pixel values indicate the grey levels (brightness) in the space domain of the digital images.

Figure 2:
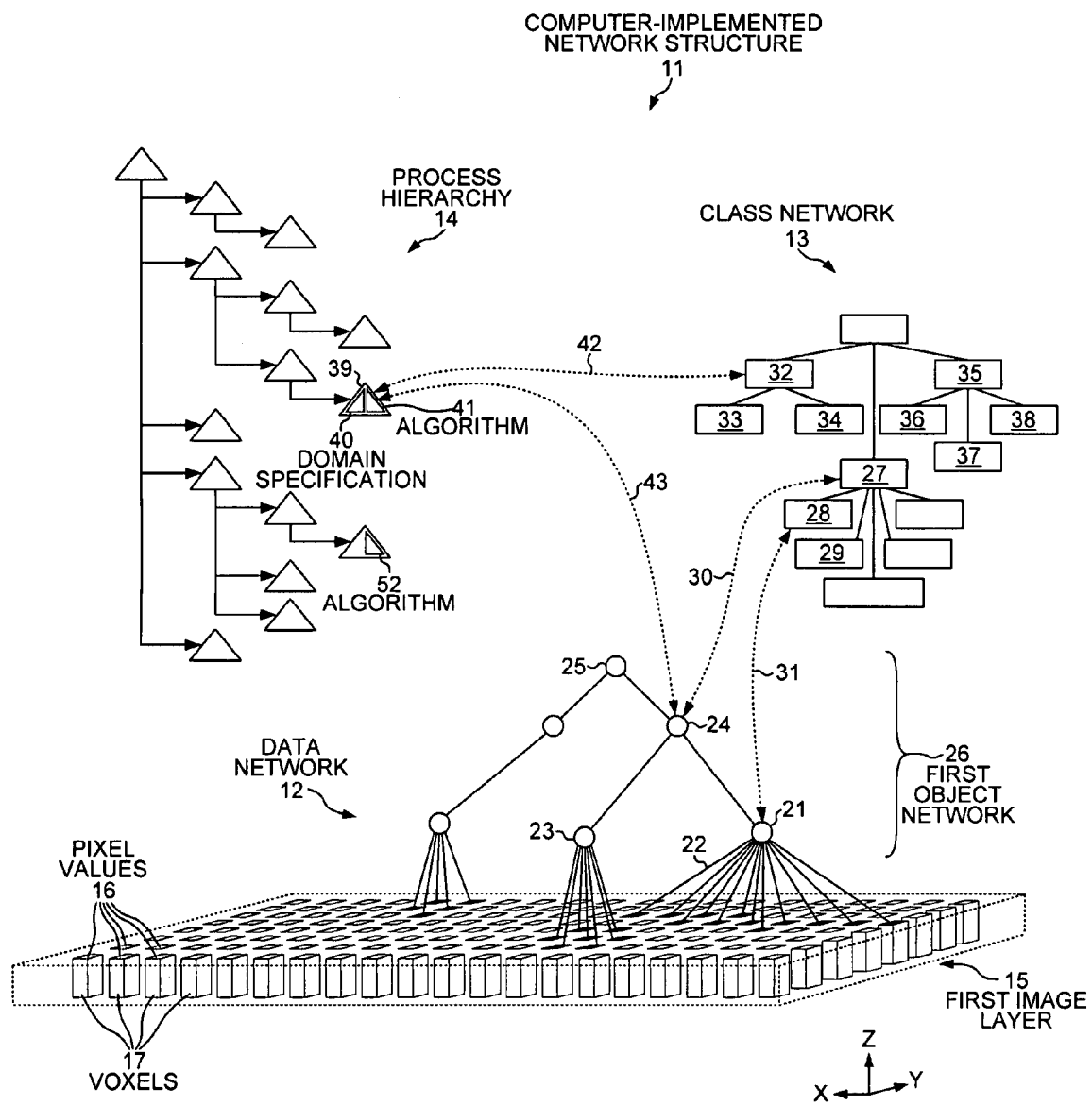
FIG. 2 is a simplified schematic diagram of a computer-implemented network structure that includes a data network, a class network and a process hierarchy; the network structure is used to generate an anatomical model from digital image slice of FIG. 1.

FIG. 2 is a simplified schematic diagram of a computer-implemented network structure 11 used to generate the anatomical model from digital image slice 10 and the associated parallel planar scans of the patient. Network structure 11 includes a data network 12, a class network 13 and a process hierarchy 14. The classes of class network 13 describe categories of anatomical objects that the user expects to find in the digital image slices. Process hierarchy 14 describes how the digital image slices are to be analyzed in order to find target objects. Process hierarchy 14 defines the process steps performed on the pixel values and associated objects of data network 12. Data network 12 includes image layers, thematic layers and object networks. For each digital image slice of the patient, the Cognition Program generates an image layer of pixel values. The pixel location associated with each pixel value is linked to an object of an object network. Moreover, an object can be linked to (i) other objects in the object network, (ii) various pixel locations of an image layer, (iii) classes of class network 13, and (iv) process steps of process hierarchy 14.

FIG. 2 shows that data network 12 includes objects linked to each other and to pixel locations of a first image layer 15 having digital pixel values 16. The digital pixel values 16 of first image layer 15 are obtained from digital image slice 10 of FIG. 1. In this example; each digital pixel value 16 of first image layer 15 represents the spectral intensity sensed by a CT scanner as emanating from a defined volume within the chest of the patient. Thus, each of digital pixel values 16 represents the spectral radiation sensed in the volume of a "voxel" 17 as opposed to merely the radiation from the area of a pixel. The x and y dimensions of the two-dimensional kernel of each voxel 17 are the same. In this example, the z dimension of each voxel is much larger, for example 1.5 millimeters long in the vertical z dimension of the patient. Thus, digital image slice 10 represents radiation sensed from a 1.5-millimeter thick slice through the chest of the patient. The objects of data network 12 are linked to the "pixel" locations of the three-dimensional voxels 17.

A first object 21 is linked by a first link 22 to a pixel location associated with a digital pixel value indicating a spectral intensity. First object 21 and a second object 23 are both linked to a third object 24. Third object 24 is, in turn, linked to a fourth object 25. The interlinked objects make up a first object network 26.

Data network 12 also includes thematic layers, which are not shown in FIG. 2. Thematic layers are used in combination with the image layers and the object networks to analyze the digital image slices. There is a one-to-one relationship between a pixel location of a voxel 17 and the thematic class of a thematic layer. In one example, operations are performed on the pixel values associated with an object depending on the thematic class linked to each pixel location that is linked to the object.

Class network 13 includes classes linked to subclasses that describe what the user of the Cognition Program expects to find in the digital image slices. In a specification mode, the user starts by giving each class a name. The Cognition Program allows the user to create and modify scripts using standard Microsoft Windows user-interface elements, such as drag and drop, tree controls, and list boxes. In this example, the user specifies the organs that he expects to find in the digital image slices and that will make up the anatomical model. In an execution mode, the detection and analysis system then classifies the objects of data network 12 into the classes of class network 13.

In this example, the user has specified a class 27, which is linked to a subclass 28 and to a second subclass 29. Class 27 corresponds to "lymph nodes", and each of subclasses 28 and 29 corresponds to a particular lymph node that will be detected and analyzed. In the execution mode, the detection and analysis system classifies third object 24 of data network 12 as belonging to class 27 by linking class 27 and third object 24 with a second link 30. First object 21 is classifies as belonging to subclass 28 and has been linked to subclass 28 with a fourth link 31.

In addition, the user has specified a class "lungs" 32, as well as subclasses for "left lung" 33 and "right lung" 34. The user has specified a class "bones" 35, as well as subclasses for "ribs" 36, "spine" 37 and "pelvis" 38. Class network 13 also includes classes for other anatomical objects, which are not shown in the simplified diagram of FIG. 2. Examples of such other classified anatomical objects are the trachea, subcutaneous fat, skin, muscles, the aorta, the heart, the liver, the kidneys, the spleen, the stomach, and the spinal cord. The user also specifies helper classes to categorize parts of each digital image slice for which the user does not know the contents.

Process hierarchy 14 includes a process step 39. Process step 39 in turn includes a domain specification 40 and a first algorithm 41. In the execution mode, process step 39 is linked by a link 42 to the class "lungs" 32. First algorithm 41 is linked by a link 43 to third object 24. Thus, a process step in process hierarchy 14 is linked to a class of class network 13. Moreover, an algorithm of a process step in process hierarchy 14 is linked to an object in data network 12.

Figure 3:
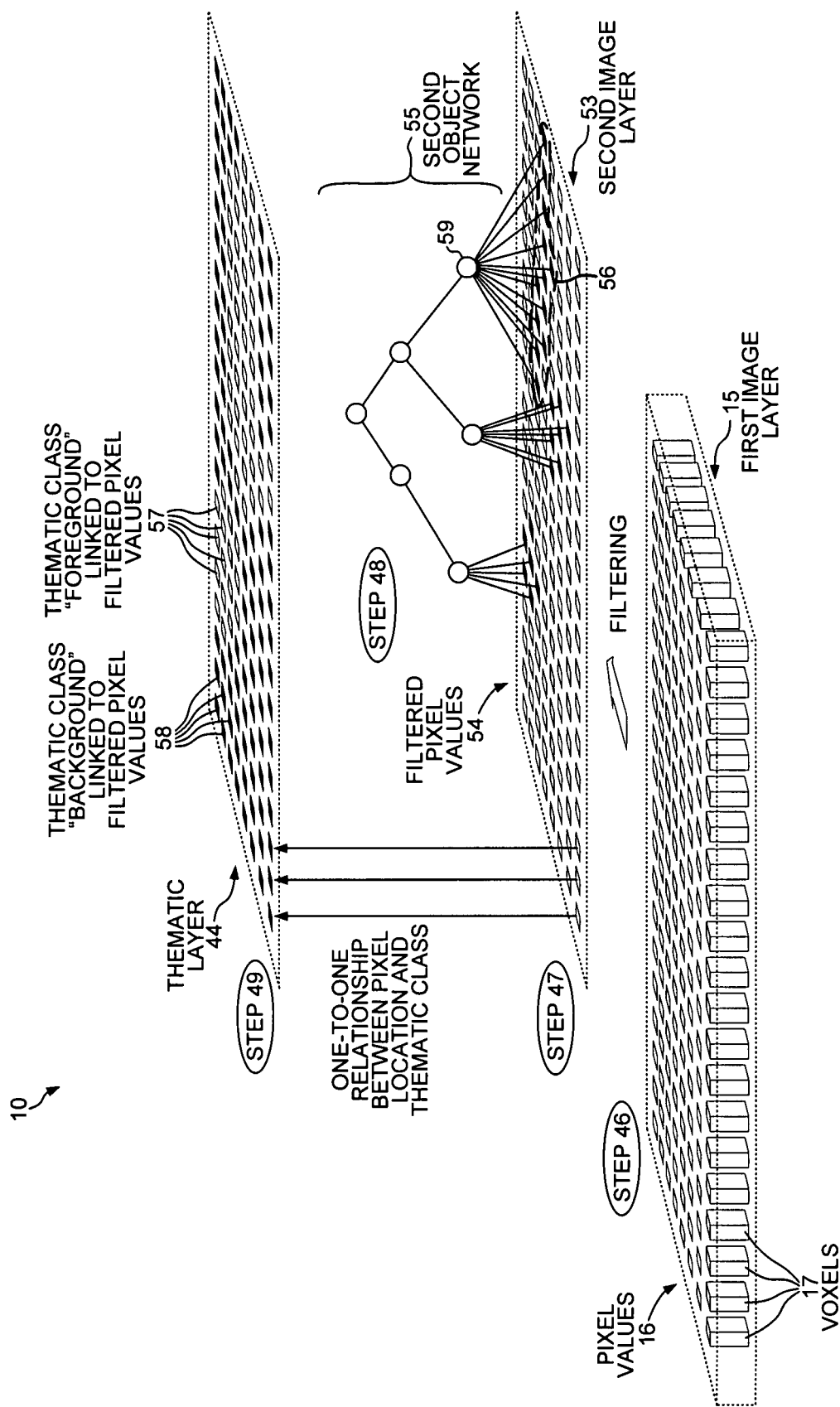
FIG. 3 is a simplified diagram of a data network including image layers, a thematic layer and an object network.

FIG. 3 shows a thematic layer 44 that is generated from first image layer 15. In the specification mode and before the pixel values are acquired, the user specifies the class network, the process hierarchy and also the thematic classes that describe categories of pixel locations. For example, the user has specified "foreground" and "background" thematic classes of pixel locations.

Figure 4:
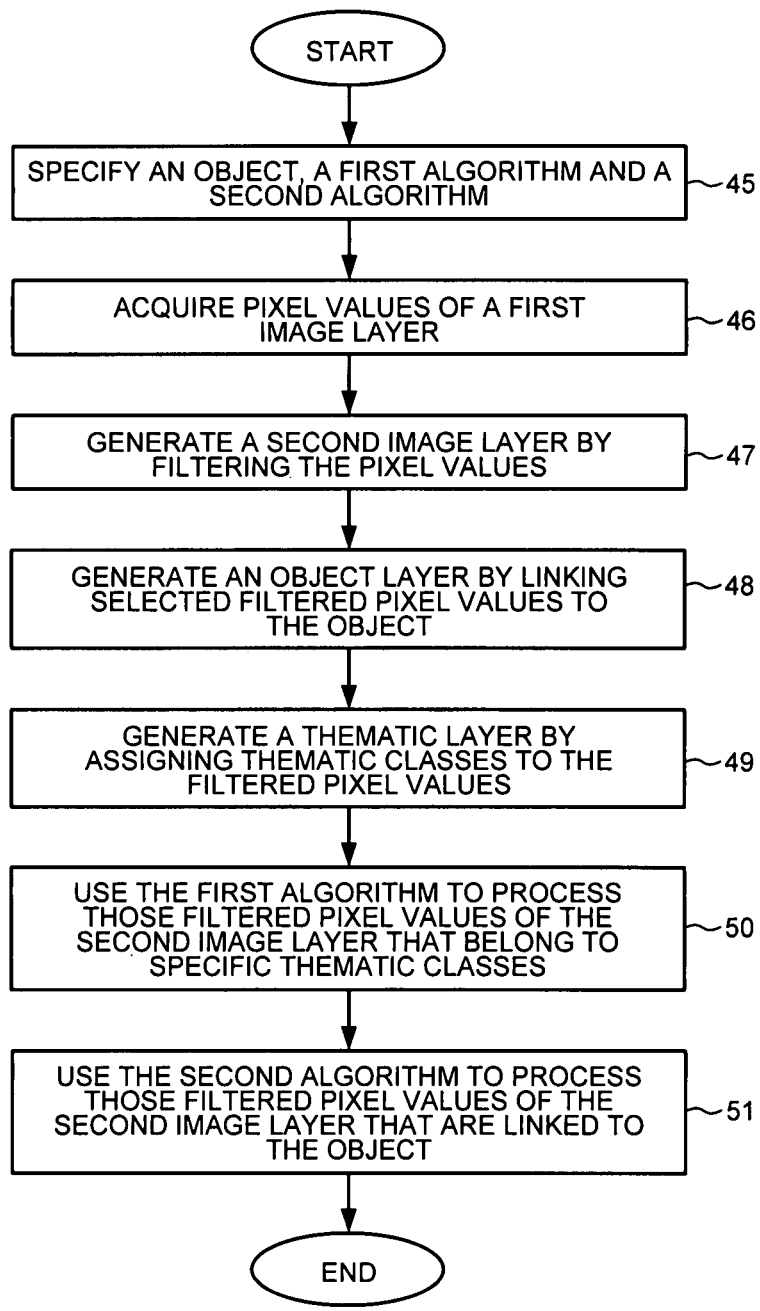
FIG. 4 is a flowchart of steps by which the thematic layer of FIG. 3 is used to detect and analyze an anatomical object.

FIG. 4 is a flowchart illustrating steps 45-51 of a method by which the detection and analysis system uses thematic layer 44 to detect a target region. The method of FIG. 4 analyzes digital image slice 10 by filtering only those pixel values that are associated with pixel locations assigned to a specific thematic class. Then, only those pixel values are filtered that are associated with pixel locations linked to an object. The steps of FIG. 4 will now be described in relation to the operation of network structure 11 of FIG. 3.

In a first step 45, the user specifies the classes of class network 13 as well as thematic classes. The user also specifies first algorithm 41 and a second algorithm 52 of process steps of process hierarchy 14.

In a step 46, the analysis system acquires pixel values 16 of first image layer 15. Each of the pixel values 16 is associated with a pixel location of a voxel 17. For example, a pixel location corresponds to a memory location in which an acquired digital pixel value is stored.

In a step 47, the analysis system generates a second image layer 53 by filtering all of the pixel values of first image layer 15. Second image layer 53 is composed of filtered pixel values 54. For example, a Gaussian filter is applied to pixel values of first image layer 15 and blurs the distinctions between the filtered pixel values 54 of second image layer 53. The pixel locations associated with each of the pixel values 16 are the same pixel locations of the corresponding filtered pixel values 54. Thus, one pixel location is associated with multiple pixel values, one for each image layer that the analysis system generates.

In a step 48, the detection and analysis system generates a second object network 55 by selectively linking objects to pixel locations associated with filtered pixel values 54 of second image layer 53 according to process hierarchy 14 and class network 13. For example, FIG. 3 shows that within a pixel region 56, first object 21 is linked to twelve pixel locations that are associated with filtered pixel values 54.

In a step 49, the analysis system generates thematic layer 44 by assigning thematic classes to each of the pixel locations associated with filtered pixel values 54. There is a one-to-one relationship between each pixel location and a class of thematic layer 44. Because the thematic class of each pixel location depends only on the characteristics of an associated pixel value, such as brightness, thematic layer 44 can be used for pixel-oriented processing. On the other hand, object-oriented processing is more complex and depends on whether a pixel location is linked to an object. But object-oriented processing is less susceptible than is pixel-oriented processing to inaccuracies caused by varying brightness and contrast of images acquired from different machines. Whether a pixel location is linked to an object can depend on the shape or size of the object that would result if the pixel location were included in the object. Moreover, whether a pixel location is linked to an object can also depend on the average brightness of all of the pixel values associated with the object that would result if the particular pixel location were to be included in the object. In contrast, whether a pixel location is linked to a thematic class does not depend on the characteristics of the pixel values associated with any other pixel location. Because the thematic classification of a pixel location does not depend on the characteristics of pixel values of any other pixel locations, the generation of thematic layer 44 is fast and is not computationally intensive.

In the example of FIG. 3, each pixel location is classified as belonging either to the thematic class "foreground" or to the thematic class "background" based on the filtered pixel values 54. FIG. 3 shows some of the "foreground" classes 57 and some of the "background" classes 58 of thematic layer 44 that are linked to pixel locations. In one embodiment, pixel locations associated with those filtered pixel values 54 having a brightness above a specified threshold are classified as having the thematic class "foreground". Pixel locations associated with those filtered pixel values 54 having a brightness below the specified threshold have the thematic class "background".

In a step 50, first algorithm 41 is used to process those filtered pixel values 54 of second image layer 53 that are linked to an object 59. For example, an edge filter is applied only to the filtered pixel values 54 that fall within pixel region 56. The result of step 50 is a third image layer with twice-filtered pixel values that are linked to object 59 of second object network 55.

In one example, the edge filter first calculates the overall mean brightness of the pixel values in a rectangular L×W×H neighborhood of pixel locations surrounding each pixel location linked to object 59, where L is the length in voxels, W is the width in voxels, and H is the height in voxels of the neighborhood. In this example, the rectangular neighborhood is a 5×5×3 box of pixel locations centered on the pixel location of interest. The height H in the z dimension depends on the thickness of the digital image slices. In another example, the neighborhood of pixel locations consists of $(N^2 \times H)-1$ pixel locations centered on the pixel location of interest, wherein N is an odd integer greater than one. Thus, although the edge filter is applied only to those filtered pixel values 54 associated with pixel locations linked to object 59, the edge filter uses pixel values that are not associated with pixel locations linked to object 59 to determine the filter output. Pixel values from multiple digital image slices are used in the calculation. The edge filter then calculates a mean darkness of those pixel values associated with the L×W×H or $(N^2 \times H)-1$ neighborhood of pixel locations that are darker than the overall mean brightness. The edge filter then outputs an edge signal for each pixel location of interest. The edge signal is the absolute value of the mean darkness minus the overall mean brightness. The output of the edge filter then generates the third image layer, which is sometimes called an "edge filtered image".

In one embodiment, the edge filtered image determined in step 50 (the third image layer) is then superimposed in an additional step over the twice-filtered pixel values obtained from the next step 51. The superimposed image emphasizes the edges of the anatomical objects being analyzed.

In a step 51, second algorithm 52 is used to process those filtered pixel values 54 of second image layer 53 that belong to a specific thematic class. For example, a second Gaussian filter with different parameters is applied to the filtered pixel values 54 associated with pixel locations that have the thematic class "foreground". The result of step 51 is a fourth image layer with twice-filtered pixel values at the pixel locations associated with the thematic class "foreground".

Where the detection and analysis system processes digital image slice 10 of FIG. 1 according to the steps of FIG. 4, the pixel values are first filtered. Then the filtered pixel values are classified as being in either the thematic class "foreground" or the thematic class "background" based on a brightness threshold. A histogram of the brightness distribution of the filtered pixel values is used to determine the brightness threshold. The brightness distribution and threshold vary depending on the imaging equipment. In this example, pixel locations associated with filtered pixel values whose brightness falls below the brightness threshold are classified in the thematic class "background". The remaining pixel locations are classified as "foreground".

For additional details on how the analysis system uses image layers, thematic layers and object networks to detect target objects, see U.S. patent application Ser. No. 11/709,601 entitled "Analyzing Pixel Data Using Image, Thematic and Object Layers of a Computer-Implemented Network Structure," filed on Feb. 21, 2007, the subject matter of which is incorporated herein by reference.

Figure 5:
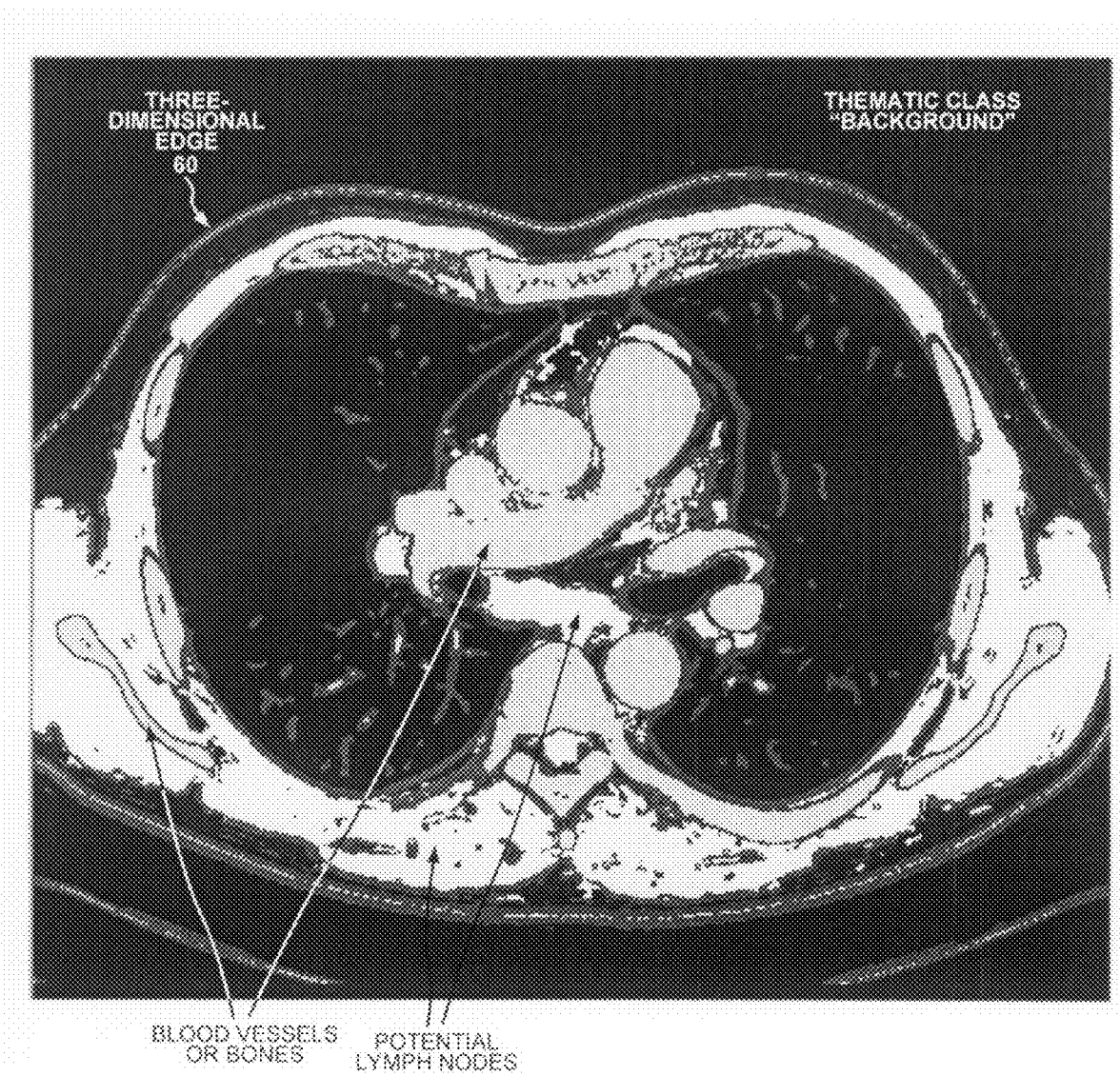
FIG. 5 is an image layer generated using both object-oriented and pixel-oriented processing steps of FIG. 4.

FIG. 5 shows the results of the object-oriented processing of step 50 and the pixel-oriented processing of step 51. A three-dimensional edge 60 is indicated on a two-dimensional image layer generated after steps 50 and 51. Three-dimensional edge 60 separates the pixel locations of voxels classified with a "background" thematic class from the other pixel locations classified as "foreground". Background and foreground pixel locations are distinguished without any context knowledge of the probable locations of any anatomical objects.

The method of steps 45-51 is repeated as successive anatomical objects are detected. The previous detection of context objects is used in the subsequent detection of other anatomical objects. An anatomical model is generated by detecting easily identifiable organs first and then using those organs as context objects to detect other organs. Each context object exhibits a property that depends on the voxels linked to the context object. An example of such a property is the location in three dimensions of the center voxel of the context object. Other properties of voxels linked to an object include brightness, color, area, asymmetry, density and the angles along the border of the object. Then the membership function of a potentially matching class determines whether a candidate object belongs to the potential class based on a relation between the property of the voxels linked to the candidate object and a property of the context object. For example, FIG. 5 shows objects in a helper class that have a potential of being classified as lymph nodes in later steps. Whether the objects having the helper class are later re-classified as having the class "lymph nodes" 27 depends on the relation between the location of the candidate object and the location of a context object, such as the aorta.

Figure 6:
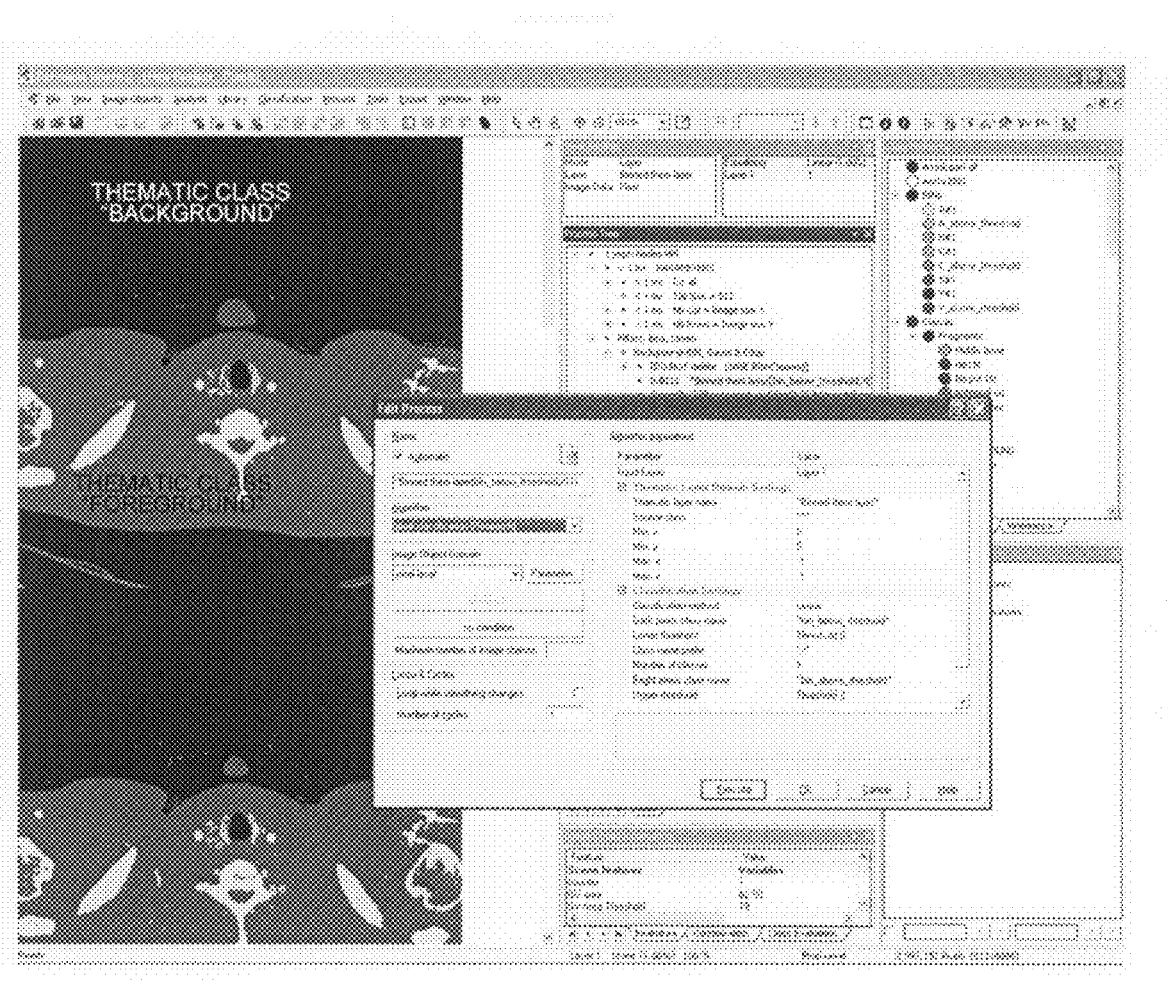
FIG. 6 is a screenshot of a pop-up window generated by a Cognition Program to assist in specifying an algorithm in a process step of the process hierarchy of FIG. 2.

FIG. 6 is a screenshot of the graphical user interface of the Cognition Program in the specification mode. Digital image slices other than those associated with digital image slice 10 are being analyzed at the left of the screenshot of FIG. 6. The user specifies the classes of class hierarchy 13 as well as thematic classes using the window on the right of the screenshot. The user adds or edits classes by right mouse clicking and responding to the queries in the pop-up window. The user can define "helper" classes for objects that have not yet been identified. The analysis system assigns certain objects to "helper" classes during the iterative segmentation and classification process and before the analysis system determines the optimal class for those objects. The user is asked to name the new class and enter properties of objects that belong to the class, such as location, brightness, color, planar area, surface area, volume, asymmetry, density and the angles along the border of the object. Thus, the Cognition Program can also analyze color digital image slices. For example, the user can define an "asymmetry function" as part of a membership function for objects belonging to a class. The asymmetry function describes the shape of the voxels that make up an object by approximating a three-dimensional ellipse (egg shape). For example, the user can use the asymmetry function to classify objects that have shapes indicative of a particular human organ. The numerator of the asymmetry function describes the long axis of the egg shape, and the denominator describes the short axis. A voxel shape that approximates a sphere has an asymmetry value of one. An elongated egg shape has an asymmetry value much greater than one. The user can also define a density function to classify objects that have shapes indicative of particular organs. The density function is the square root of the volume of the voxels divided by the area of the border around the voxels that comprise the object.

The user specifies the process steps of process hierarchy 14 using the window labeled "Process Tree" in the middle of the screenshot of FIG. 6. For example, by right mouse clicking on a process step in the middle window, a pop-up window appears with a dialogue asking the user whether he wishes to add a sub-process step or append a process step below the clicked process step. The user is then asked to choose a domain and an algorithm for the new process step. Existing process steps can also be edited. In the example of FIG. 6, the user is editing a sub-process step that classifies pixel locations into thematic classes. The user has clicked on the sub-process step "Binned them layer [bin_below_threshold, X(1)". The "0.811 s" at the beginning of the sub-process step indicates the time in seconds required to perform the sub-process step. The user is specifying two thematic classes of pixel locations. The voxels at particular pixel locations are placed in various "bins". Dark voxels are assigned to the thematic class "bin_below_threshold", and bright voxels are assigned to the thematic class "bin_above_threshold". These classifications correspond to the background and the foreground pixel locations in image layer at the left of the screenshot of FIG. 6.

Figure 7:
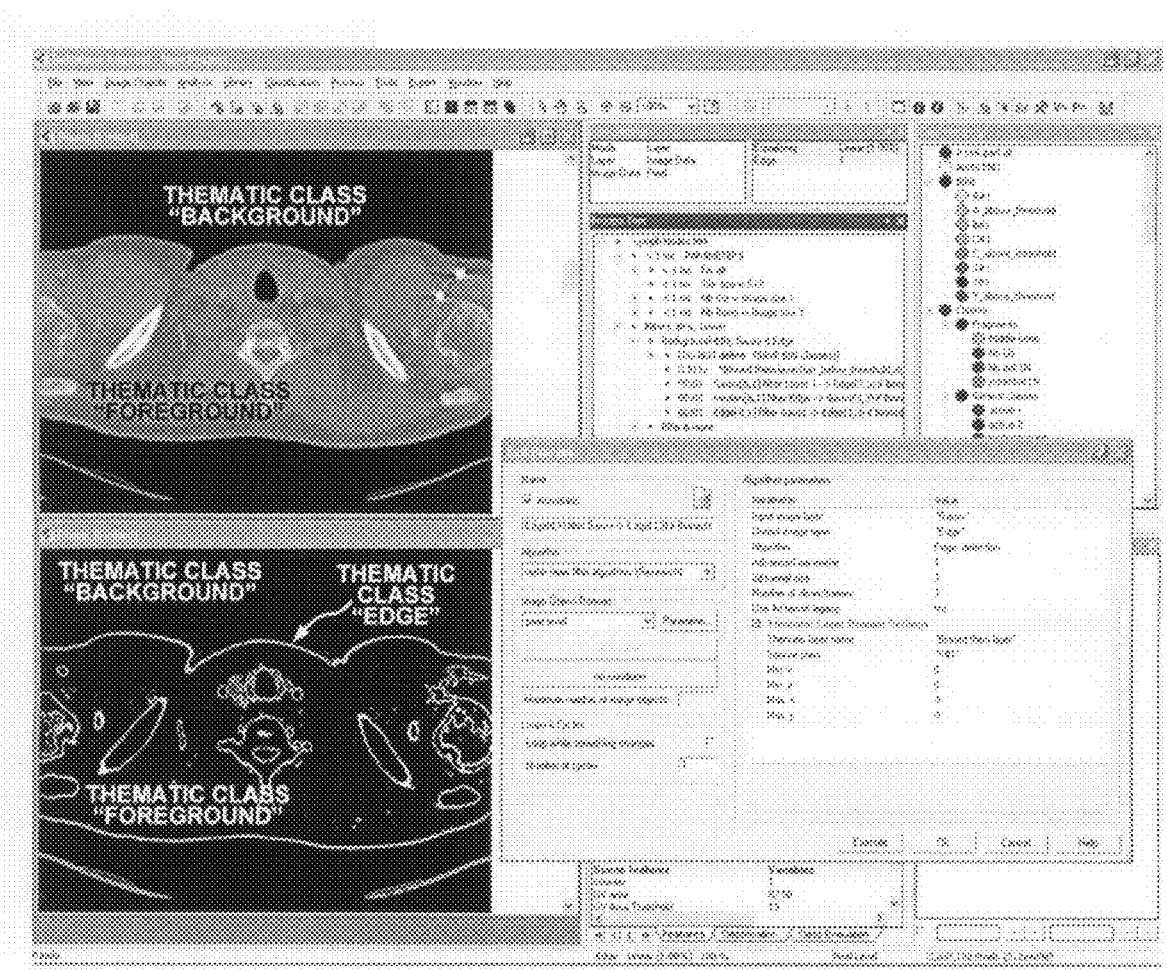
FIG. 7 is a screenshot of a pop-up window generated by a Cognition Program to assist in specifying another algorithm that is a filter.

FIG. 7 is a screenshot of the graphical user interface of the Cognition Program in which the user is editing a sub-process step that applies an edge filter to the pixel locations in the "foreground" thematic class. Before the edge filter is applied, the pixel values have been filtered with a Gauss filter and then with a Median filter. The user has clicked on the sub-process step "Edge[8,1] filter Gauss", and a pop-up window "Edit Process" appears for editing the sub-process step. The algorithm for the sub-process step is the edge filter defined by the parameters at the right of the pop-up window. The pop-up window indicates that the edge filter analyzes a neighborhood of pixel locations that consists of $(3^2 \times 3)-1$ pixel locations centered on the pixel location of interest. The 2-dimensional kernel size is 3×3, and the height of the voxel neighborhood is three slices thick. The pixel locations that are identified by the edge filter as being associated with edge voxels are then classified as having a new thematic class "edge". The digital image at the lower left of the screenshot shows a new thematic layer that is generated by the sub-process step "Edge[8,1] filter Gauss". The new thematic layer has three thematic classes: "background", "foreground" and "edge". The digital image at the upper left of the screenshot shows the image layer on which the edge filter of sub-process step "Edge[8,1] filter Gauss" was applied.

After the three thematic classes "background" (bin_below_threshold), "foreground" (bin_above_threshold) and "edge" (Y#1) have been assigned to all of the pixel locations, various new thematic classes are assigned to pixel locations that were previously classified with the "foreground" thematic class. The various thematic classes are listed under "BINs" in the window labeled "Class Hierarchy" to the right of the screenshot of FIG. 7. Then morphological changes are made to regions of pixel locations having the same thematic classes by assigning a different thematic class to a pixel location so that the corresponding voxel fits within a contiguous area or volume or falls on the same side of an edge as voxels with similar characteristics.

Figure 8:
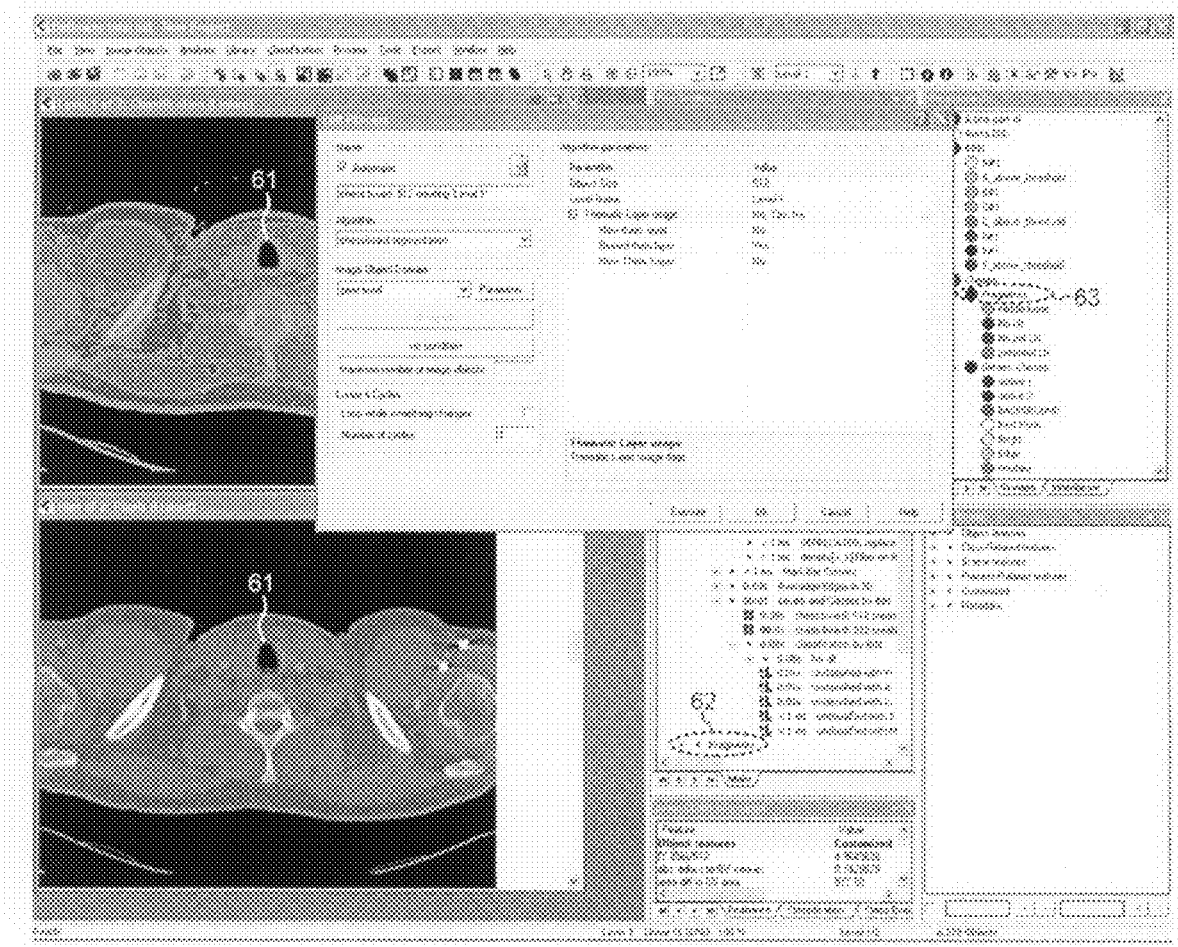
FIG. 8 is a screenshot of the graphical user interface of the Cognition Program used to specify a process step that performs object-oriented processing by creating objects from tiles of pixel locations.

FIG. 8 is a screenshot of the graphical user interface of the Cognition Program in a next step in which part of an anatomical object is identified. The parts of anatomical objects are classified into helper classes and are later combined to form organs. In FIG. 8, a fragment of an anatomical object is detected that will later be identified as being part of the aorta. In the specification mode, the user has clicked on the sub-process step "chess board: 512 creating Level 1", and a pop-up window "Edit Process" appears for editing the sub-process step. The sub-process step "chess board: 512 creating Level 1" performs object-oriented processing by creating an object of each 512×512 matrix of pixel locations on an image layer for each digital image slice. The pop-up window indicates the size of each object in the chess board with the parameter: "Object Size 512". Thus, the process step begins by linking all of the pixel locations in each 512×512 matrix to a preliminary helper object of an object network. Then the helper objects are divided and modified until all contiguous pixel locations having the same thematic class are linked to one object. At the end of the sub-process step "chess board: 512 creating Level 1", each object is linked to pixel locations within only one digital image slice. Three-dimensional linking of pixel locations in different image slices is performed later. In the image in the upper left box labeled "Level 1 of 2: Classification (Linked)", an object 61 is outlined. In the image in the lower left box labeled "tiles of 2: Pixels (Linked)", the outline of object 61 is superimposed over the image layer shown in the upper left box of FIG. 7. Based on the size of object 61 and its location relative to other objects, the detection and analysis system later identifies object 61 as being part of the aorta.

In a next step 62 labeled "Fragments" of the process hierarchy, fragments of anatomical objects are modified and combined. The user has specified the characteristics of the subclasses "Fragments" 63 in the window labeled "Class Hierarchy". The subclasses "Fragments" 63 are classifications of intermediate objects that are modified and combined according to rules and algorithms in the sub-process steps below step "Fragments" 62 to generate anatomical objects. In the process hierarchy of FIG. 8, fragments are first combined to generate the lungs. Then the position of the lungs is used to assist in the subsequent identification of other anatomical objects.

Figure 9:
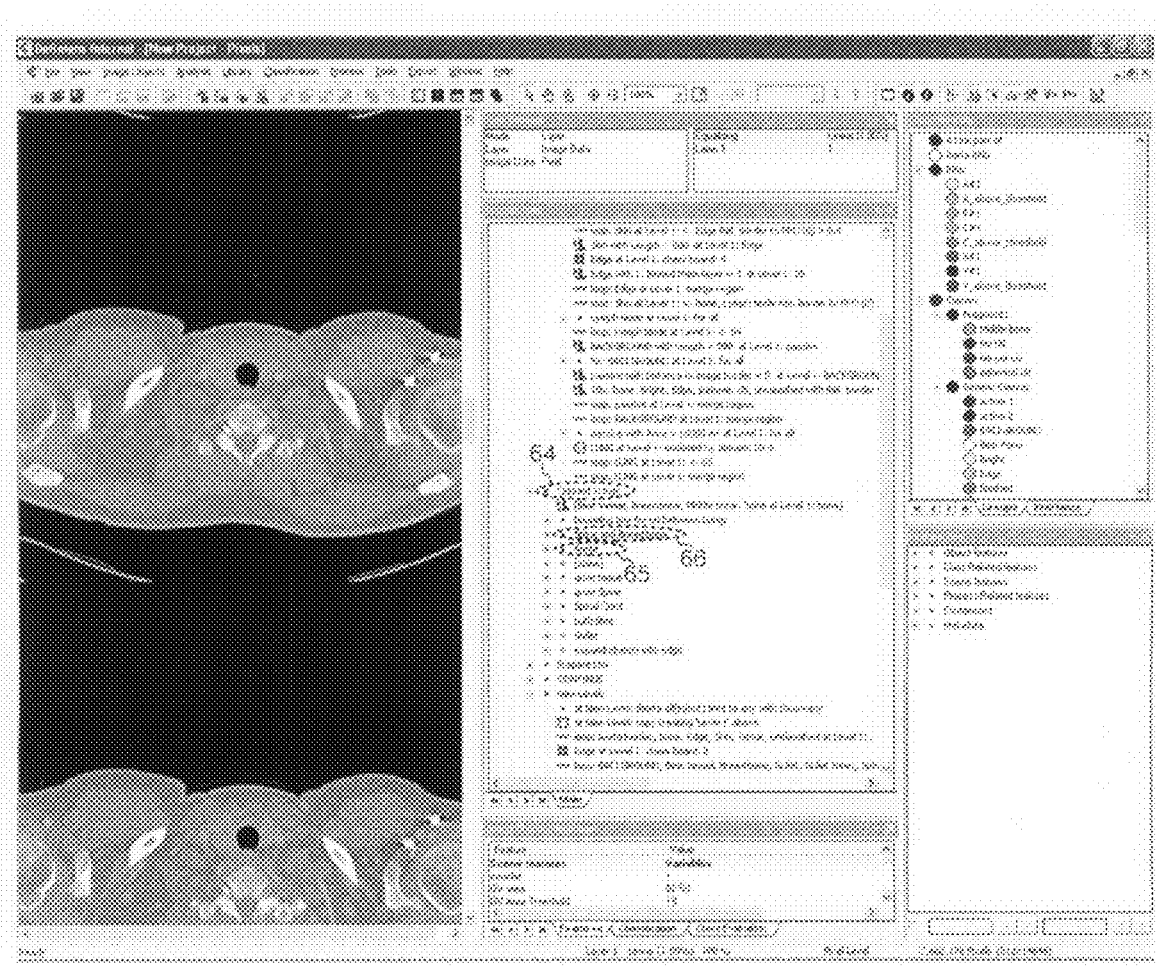
FIG. 9 is a screenshot of the graphical user interface of the Cognition Program used to specify a process step in which various anatomical objects are detected using the lungs as context objects.

FIG. 9 is a screenshot of the graphical user interface of the Cognition Program in a subsequent step "Context Lungs" 64 in which various anatomical objects are identified after the lungs have been identified. The object "lungs" is used as a context object to assist in detecting other organs, such as the spine, the aorta, the spinal cord, the trachea (Luftröhre) and the esophagus (gullet). The process hierarchy includes a separate sub-process step with its own algorithms and domain specification for detecting each of these other organs. For example, object 61 that was detected in FIG. 8 is identified in a sub-process step 65 as being part of the aorta based upon its orientation to the lungs.

In addition to the relation of a candidate object to a context object, properties of the candidate object are also used to classify the candidate object. Both two-dimensional and three-dimensional properties are used. For example, the cross-sectional area of an object in one image slice is used to classify a candidate object. In FIG. 9, a sub-process step 66 is highlighted in which the spine and breastbone are detected based on their relation to the lungs. An additional parameter used to classify a candidate object as belonging to the "spine and breastbone" class is the cross-sectional area of the candidate object. In the box labeled "Image Object Information" at the bottom of FIG. 9, the minimum area required for a candidate object to be considered for the "spine and breastbone" class is listed as "GV Area Threshold 19".

Three-dimensional properties are also used to classify candidate objects. A three-dimensional object "aorta" is generated in sub-process step 65 by linking objects in different image slices to form one object representing a three-dimensional human organ. In process hierarchy 14, the process of linking objects from different image slices is called "link growth". Properties of the candidate object in the object network that represent a three-dimensional anatomical object are then determined. For example, the surface area, the volume and the asymmetry of the three-dimensional object "aorta" are determined and are used to classify a candidate object as belonging to the class "aorta". The asymmetry function indicates that the three-dimensional object "aorta" has the very elongated elliptical form consistent with the class "aorta". The volume of an object corresponding to a three-dimensional human organ is calculated by adding the areas of each of the component objects on the various image slices. The volume of a candidate object can be used to eliminate a potential class. For example, a candidate object with the correct symmetry and form to be classified as a lymph node can be excluded from the class "lymph nodes" 27 if the volume of the candidate object is too large.

When generating an anatomical model, lymph nodes have conventionally been difficult to distinguish from other anatomical objects. The detection and analysis system classifies objects as lymph nodes using multiple context objects. Those organs that are easier to detect are used as context objects. For example, each of the following organs may be used as a context object: spine, aorta, spinal cord, trachea and esophagus.

In a first example, the process steps of a particular process hierarchy call for auxiliary lymph nodes in the upper chest region to be detected using the upper part of the lungs as a context object. A candidate object is reclassified as belonging to the subclass "auxiliary lymph nodes" 29, for example, only if the location of the candidate object is between the location of an object of the subclass "left lung" 33 and the location of another object of the subclass "right lung" 34. In addition, the candidate object is reclassified as belonging to the subclass "auxiliary lymph nodes" 29 only if the brightness of the pixel values of the candidate object is a predetermined level above the brightness of the pixel values of the object of the class "lung" 32.

As digital image slices are taken higher in the patient's chest, however, the objects corresponding to the patient's lungs become smaller. In some digital image slices, the objects in the subclasses 33 and 34 may not be sufficiently large to be used as context objects. Moreover, there may not be a sufficiently large number of pixel values accurately to calculate the various properties used as a relation to the candidate object. Where a primary context object is not present or the properties of the primary context object cannot be accurately determined, a secondary context object is used in the detection of the candidate object. A primary context object may also not be present if the digital image slice does not cover the entire cross section of the patient's torso. In that case, the primary context object may be simply outside of the acquired image. In the first example, if the primary context objects having the subclasses "left lung" 33 and "right lung" 34 are not present, then the particular process hierarchy uses an object belonging to the class "trachea" as a secondary context object. The relation between a property of the object of the class "trachea" and a property of the candidate object is then used to determine whether the candidate object should be re-classified in the subclass "auxiliary lymph nodes" 29.

In a second example of a particular process hierarchy, both the primary context object and the secondary context object are present. The candidate object is re-classified from belonging to a helper class to belonging to a particular class using the context object that best fits the membership function of the class to which it belongs. For example, the membership function of the class "trachea" determines that a candidate object belongs to the class "trachea" based on the relation between a property of the voxels linked to the candidate object and a property of the voxels of either the primary context object "lower part of heart" or the secondary context object "upper part of stomach". Whether the property of voxels that are potentially linked to the object "trachea" is compared to the property of the voxels of the primary or secondary context object depends on which context object has voxels with a better fit to the membership function of the associated class. Thus, the membership function of the class "trachea" classifies the candidate object based on a relation between the candidate object and the secondary context object "upper part of stomach" when the membership function of the subclass "upper part of stomach" determines a better fit for the secondary context object than the fit of the primary context object determined by the membership function of the subclass "lower part of heart".

By relying on secondary context objects when primary context objects are inadequate or unavailable, the detection probability of the target objects is increased. The increase in the detection rate is substantial when a chain of detection steps is involved. For example, when the classification of a target object involves the classification of ten precursor objects, the overall probability of achieving the correct classification of the target object is about 35% ($0.9^{10}$) when the probability of using a primary context object to classify each precursor object correctly is 90%. However, when a secondary context object is used in the 10% of cases when the primary context object is deficient for classifying each of the ten precursor objects, and when there is a 90% probability of using the secondary context object to classify each precursor object when the primary context object is deficient, then the probability of correctly classifying all ten precursor objects increases to about 89%.

Figure 10:
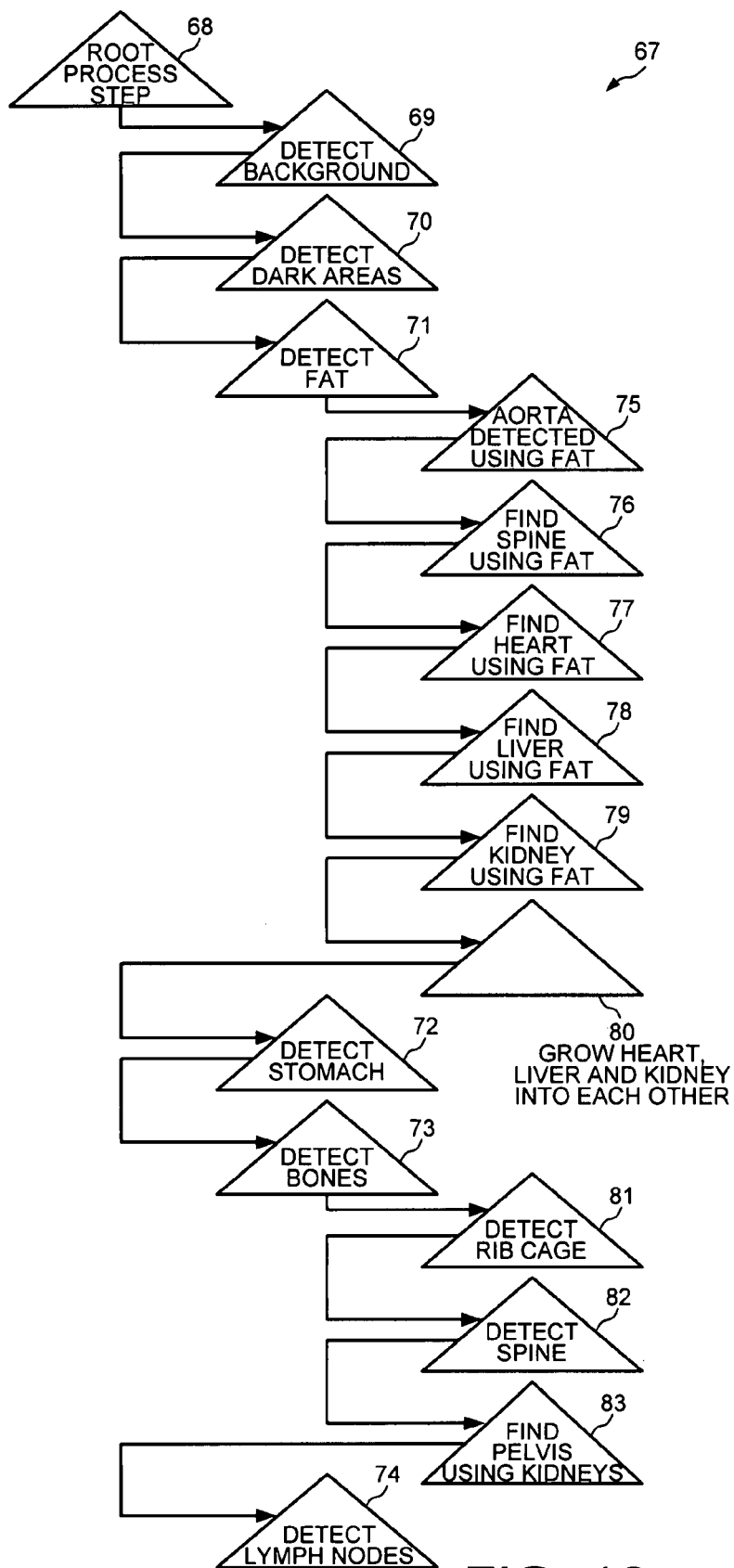
FIG. 10 is a diagram of a simplified process hierarchy of another embodiment of process steps for detecting lymph nodes.

FIG. 10 shows a simplified process hierarchy 67 in another embodiment of the detection and analysis system. Process hierarchy 67 describes a particular order of process steps used to detect lymph nodes. Process hierarchy 67 includes a root process step 68 named "Lymph Nodes MM". The user has specified six process steps 69-74 and nine sub-process steps 75-83. For each process step or sub-process step, the user has specified a domain and an algorithm. Each domain specifies classes that define the objects of the data network upon which the algorithm is to operate at run time in the execution mode.

In a process step 69 in the execution mode, the Cognition Program analyzes the acquired digital image slices and detects the body of the patient and the background. Object-oriented processing is used in addition to pixel-oriented processing to determine the background of each digital image slice because the brightness of the pixel locations in the background and the pixel locations in the lungs is similar. The air in the lungs and the air outside the body both appear as dark pixel locations. First the background is detected, and then the body is defined as everything other than the background. For example, each pixel location that has not been assigned the thematic class "background" is assigned the thematic class "foreground". Then all of the pixel locations having the thematic class "foreground" are linked together as the object "body".

In a process step 70, the darkest areas within the body are analyzed. The darkest areas are the anatomical objects that are filled with air, such as the lungs, trachea, esophagus and intestines. First, the lungs are detected as being the two largest dark objects within the body. The two objects are assigned to the subclasses "left lung" 33 and "right lung" 34. Then, the lungs are used as context objects to detect the trachea. The trachea is a dark and relatively round object located between the left lung and the right lung.

Figure 11:
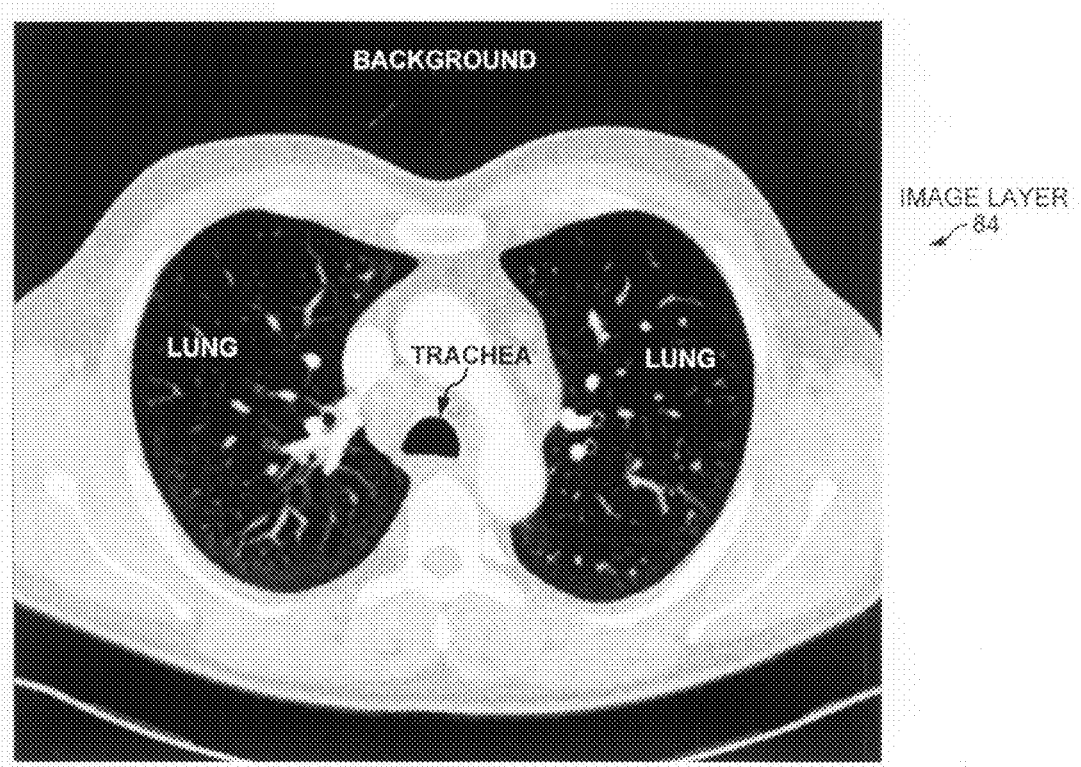
FIG. 11 is an image layer in which the trachea has been detected using the lungs as context objects.

FIG. 11 shows an image layer 84 in which the trachea has been detected using the lungs as context objects.

In a process step 71, subcutaneous fat and adjacent muscles are detected. The subcutaneous fat and muscles are near the edges of the object "body". The sub-process steps 75-79 detect the anatomical objects aorta, spine, heart, liver, kidney and spleen using the object "subcutaneous fat" as a context object.

Figure 12:
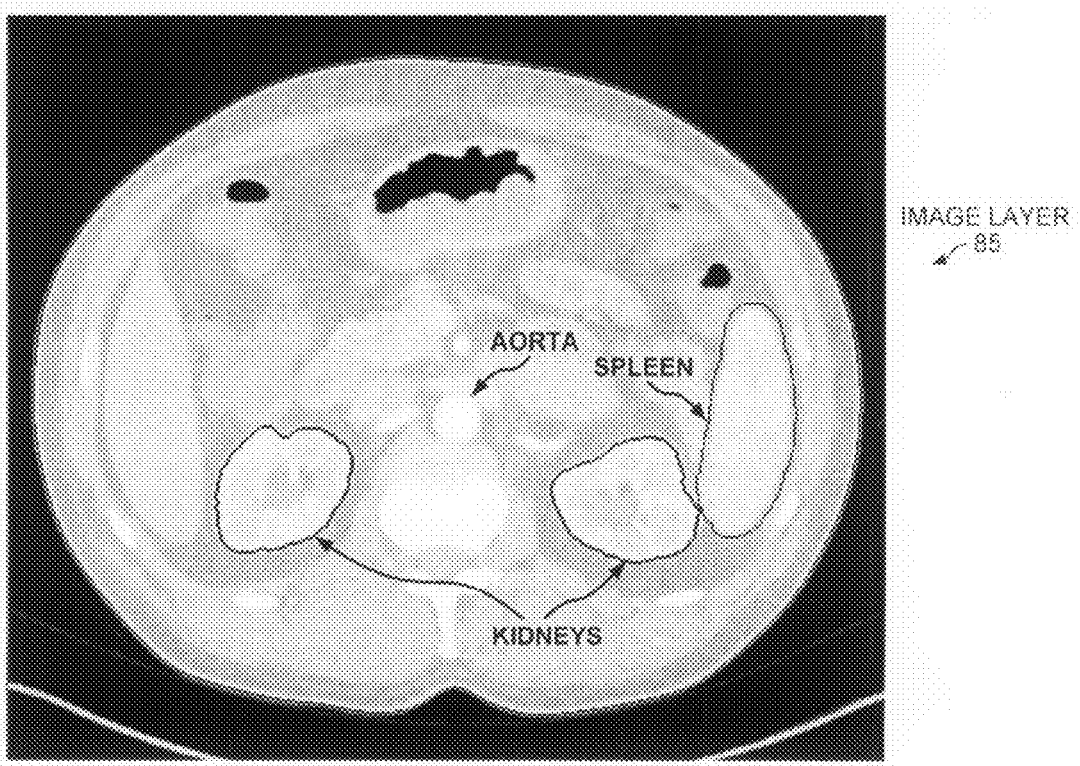
FIG. 12 is an image layer in which the aorta, kidneys and spleen have been detected using the object "subcutaneous fat" as a context object.

FIG. 12 shows an image layer 85 in which the aorta, kidneys and spleen have been detected using the object "subcutaneous fat" as a context object. Not all target anatomical objects are present in each digital image slice. For example, the lungs are not present in image layer 85 and, therefore, are not used as context objects to detect the aorta, kidneys and spleen in image layer 85. Because a primary context object may not be present in each digital image slice, the process steps of process hierarchy 67 rely on secondary context objects in situations where the primary context object is not present or is inadequate.

In a sub-process step 75, the aorta is detected. The membership function of the class "aorta" classifies a candidate object as belonging to the class "aorta" based on a relation between a property of the candidate object and a property of the object "subcutaneous fat". In one embodiment, the object "subcutaneous fat" must be centered around a pixel location that is less than a maximum distance from the center pixel position of the candidate object. The membership function of the class "aorta" also requires the symmetry function of the candidate object to indicate a relatively round object. In addition, the average brightness of the pixel values associated with the candidate object must fall within a predetermined range.

In a sub-process step 76, a candidate object is found that will later be modified to generate the object "spine". The preliminary object "spine" is near the aorta and between the left lung and right lung. In sub-process steps 77-79, candidate objects are found for the anatomical objects heart, liver, kidneys and spleen. In addition to using the object "subcutaneous fat" as a context object for finding the heart, for some image layers sub-process step 77 uses the aorta as a secondary context object. In some image layers, the object "aorta" merges into the heart.

Figure 13:
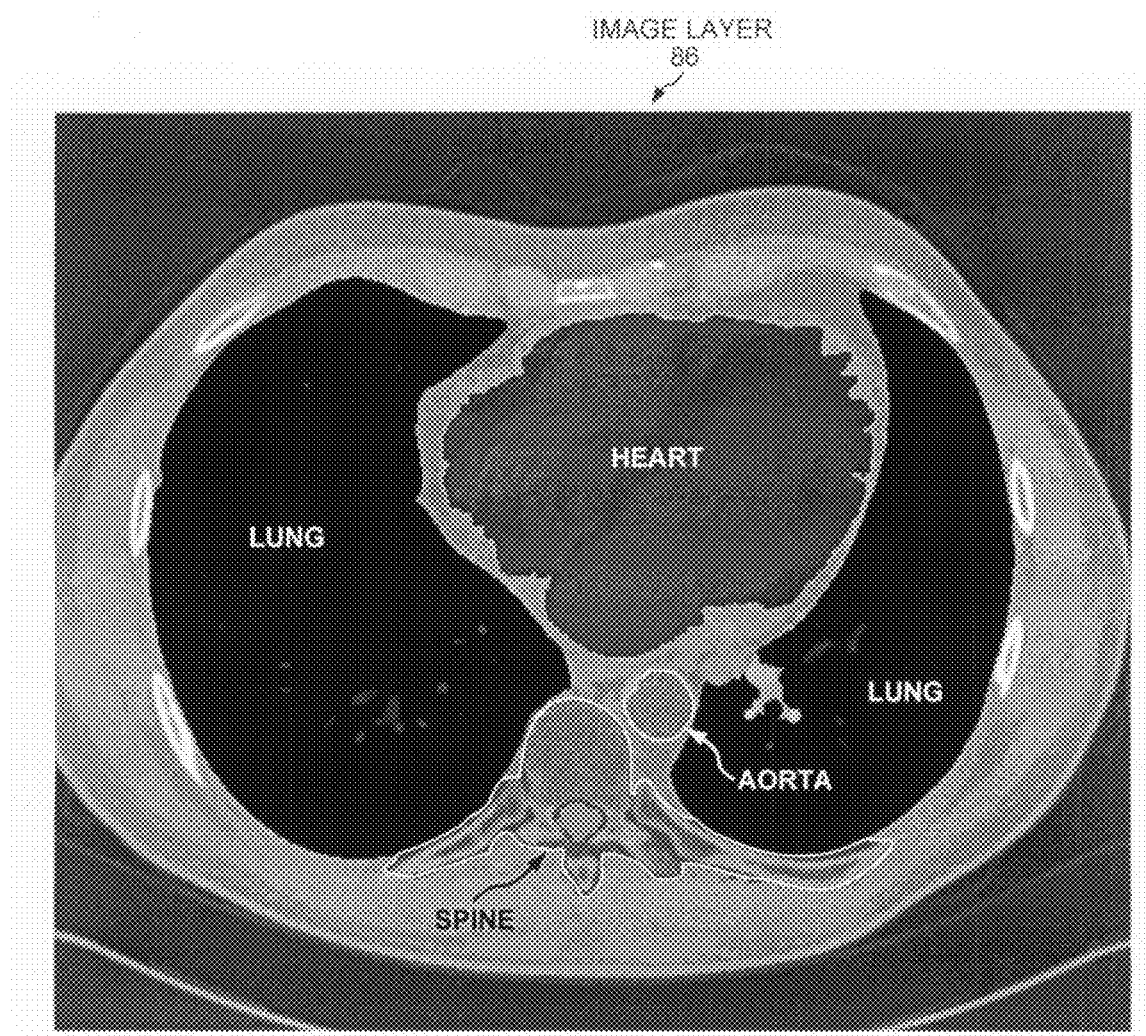
FIG. 13 is an image layer in which candidate objects for the spine and heart have been found using the object "subcutaneous fat" as a context object.

FIG. 13 shows an image layer 86 in which the aorta has been detected and candidate objects for the spine and heart have been found using the object "subcutaneous fat" as a context object.

In a sub-process step 79, candidate objects are found for the kidneys and spleen. In addition to using the object "subcutaneous fat" as a context object for finding the kidneys and spleen, the membership functions of the classes "kidneys" and "spleen" also require the candidate objects to be associated with pixel values that are relatively bright, for example, somewhat brighter than most muscles. FIG. 12 shows outlined candidate objects for the kidneys and spleen that are brighter than objects classified as muscle but darker than the object classified as the aorta. In addition, in classifying objects as belonging to the classes "kidneys" and "spleen", the objects must be located below the secondary context objects "lungs".

In a sub-process step 80, the candidate objects for the heart, the liver, kidneys and spleen are grown into each other. In one embodiment, the algorithm of sub-process step 80 performs the growth operation using thematic layers and pixel-oriented processing. A thematic layer is generated that includes a thematic class for the pixel locations of each of the heart, liver, kidneys and spleen objects. Pixel locations that are not linked to one of the heart, liver, kidneys and spleen objects are assigned the thematic class "other". Then the thematic classes "heart", "liver", "kidneys" and "spleen" are expanded into the neighboring pixel locations classified as "other". For example, the thematic class of each pixel location in the "other" thematic class that is contiguous to a pixel location in the "kidney" thematic class is converted to the "kidney" thematic class. The growth operation stops when a pixel location in the "kidney" thematic class is contiguous to a pixel location in the "spleen" thematic class, for example. Performing the expansion of the pixel locations as a pixel-oriented process is faster than directly manipulating the heart, liver, kidneys and spleen objects to achieve an expansion of pixels linked to those objects. Where a pixel value is transferred from one object to another object, both objects must be redefined to transfer the pixel value. Changing the thematic class of individual pixel locations is faster.

Figure 14A:
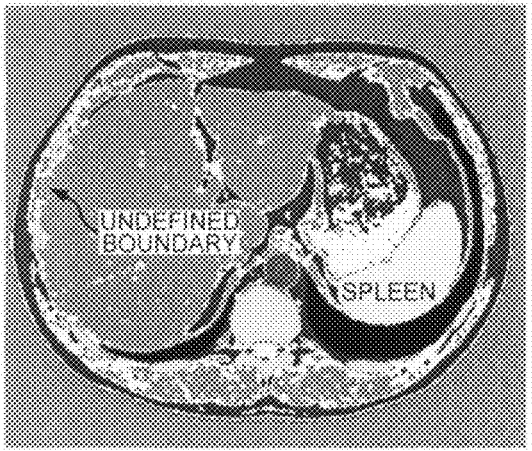
FIGS. 14A-F are image layers that illustrate a growth operation used to generate the object "liver".
Figure 14B:
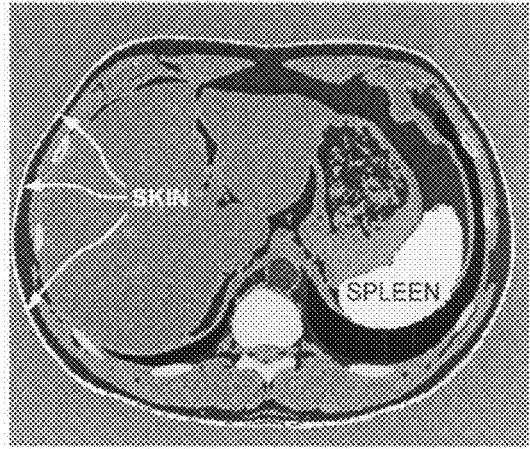

FIGS. 14A-F illustrate the growth operation used to generate the object "liver". The growth operation is more complex where an image layer does not show a sharp boundary between objects. For example, determining when to stop the expansion of the pixel locations assigned to the class "liver" is complicated where the liver grows towards muscle on the inside of subcutaneous fat. FIG. 14A illustrates this complexity and shows that the boundary between the liver and muscle on the inside of subcutaneous fat is undefined. The process of expanding the object "liver" towards an undefined boundary with muscle begins by detecting the skin. FIG. 14B shows the object "skin", which is detected by identifying pixel locations that are contiguous to pixel locations classified with the thematic class "background". Then pixel locations with the thematic class "skin" are grown away from the background.

Figure 14C:
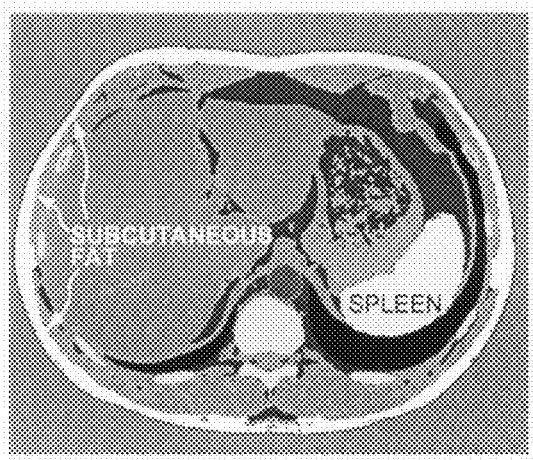

FIG. 14C shows the object "subcutaneous fat", which is detected by identifying pixel locations that are contiguous to pixel locations classified with the thematic class "skin". Then pixel locations with the thematic class "subcutaneous fat" are grown inwards, and their growth is limited using surface tension conditions.

Figure 14D:
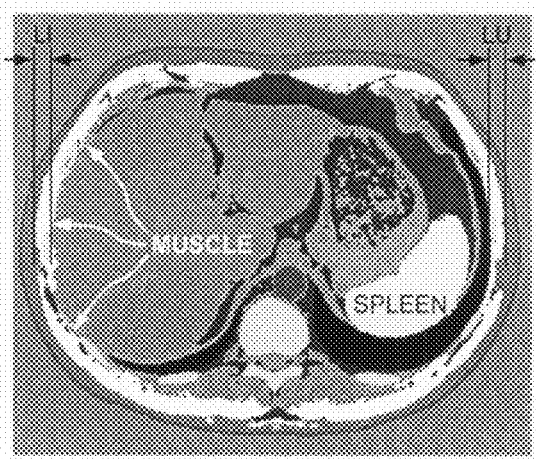

FIG. 14D shows the object "muscle". Pixel locations that are contiguous to pixel locations with the thematic class "subcutaneous fat" are reclassified in the thematic class "muscle". The growth of pixel locations classified in the thematic class "muscle" is limited such that the thickness LI of muscle between the liver and subcutaneous fat approximates the thickness LU of muscle on the opposite side of the body between the lung and subcutaneous fat.

Figure 14E:
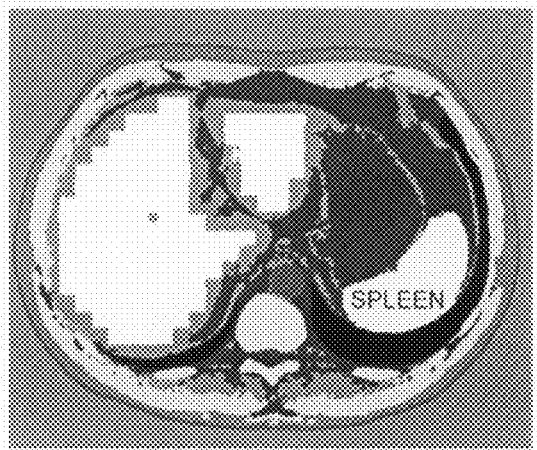

FIG. 14E shows a seed area of the liver that is then expanded up to pixel locations that belong to the thematic class "muscle". The seed area of the liver is generated using a density filter that converts brightness values that appear infrequently into the brightness of surrounding pixel values. Then the seed of the object "liver" is formed from matrices of pixel locations (tiles) that exhibit the properties specified by the membership function of the object "liver".

Figure 14F:
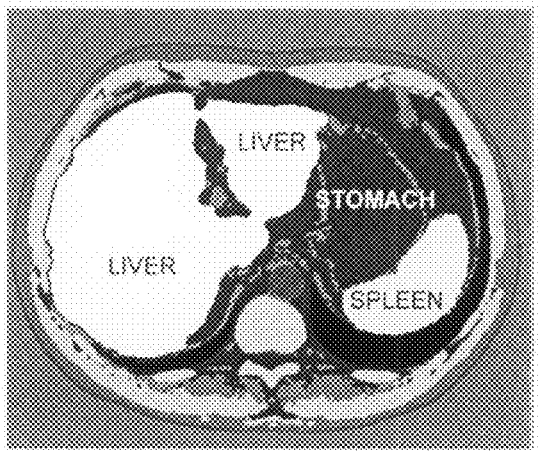

FIG. 14F shows the detected object "liver" after pixel locations have been expanded up to pixel locations that belong to the thematic class "muscle".

In a process step 72, the stomach is detected. The already detected objects "spleen" and "liver" are used as context objects to detect the stomach. Candidate objects for the stomach are located between the liver and the spleen. In addition to location, the object "stomach" is classified by the relative brightness of the muscles of the stomach. The candidate objects for the stomach are combined and then partitioned with an object-cutting algorithm. Then the parts are recombined in alternative ways and reclassified. The combination that best fits the membership function of the class "stomach" is chosen.

The object-cutting algorithm provides the best results where the contents of the stomach appear darker in the CT image slice than the stomach muscles. Other algorithms are used where the contents of the stomach are bright. As the contents of the stomach are unknown, various "stomach finder algorithms" are applied. The algorithm whose result best matches the specified location between liver and spleen and the specified shape and texture of the stomach is used.

In a process step 73, bones are detected. The sub-process steps 81-83 detect the rib cage, the spine and the pelvis, respectively. The candidate object for the spine found in sub-process step 76 is refined in sub-process step 82. In sub-process step 82, the spinal cord is also detected. The brightness (grey value) of the inner part of the spinal cord is determined and is later used for setting the threshold of brightness for detecting lymph nodes. Unfortunately, in addition to the spinal cord, other anatomical objects such as the intestine and esophagus have a brightness in CT image slices similar to that of the lymph nodes.

Figure 15:
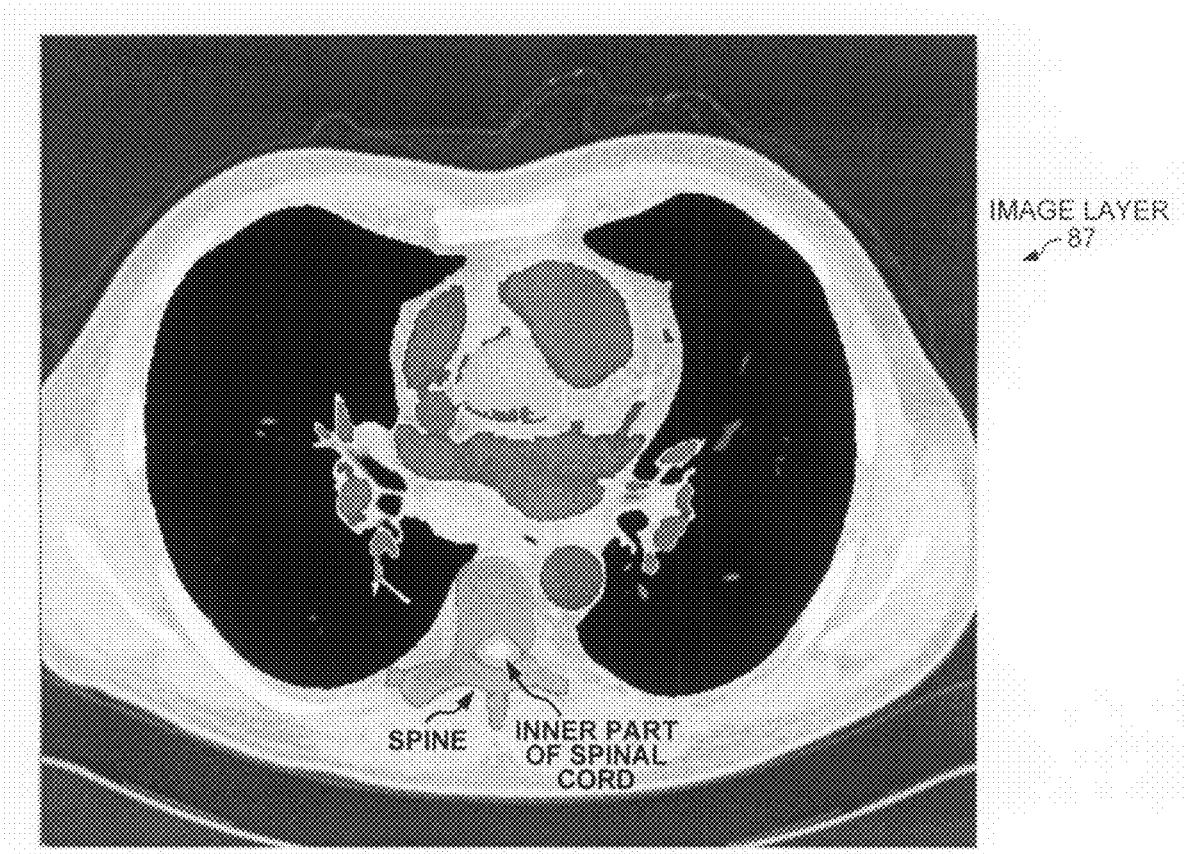
FIG. 15 is an image layer showing the bright inner part of the spinal cord that is used to set the brightness threshold for detecting lymph nodes.

FIG. 15 shows an image layer 87 in which the spine has been detected. FIG. 15 also shows the bright inner part of the spinal cord that is used to set the brightness threshold for detecting lymph nodes.

In sub-process step 83, the pelvis is detected. The kidneys are used as context objects in detecting the pelvis.

Figure 16:
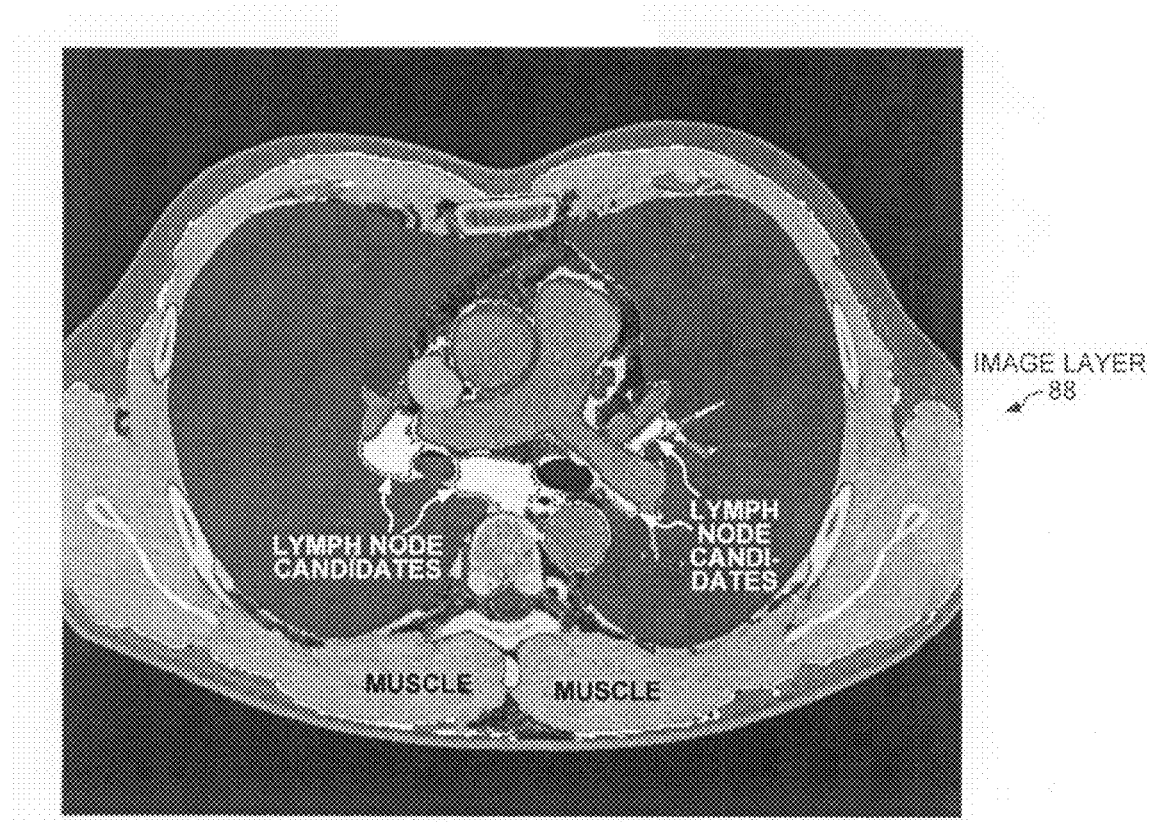
FIG. 16 is an image layer in which candidate objects for lymph nodes have been found.
Figure 17:
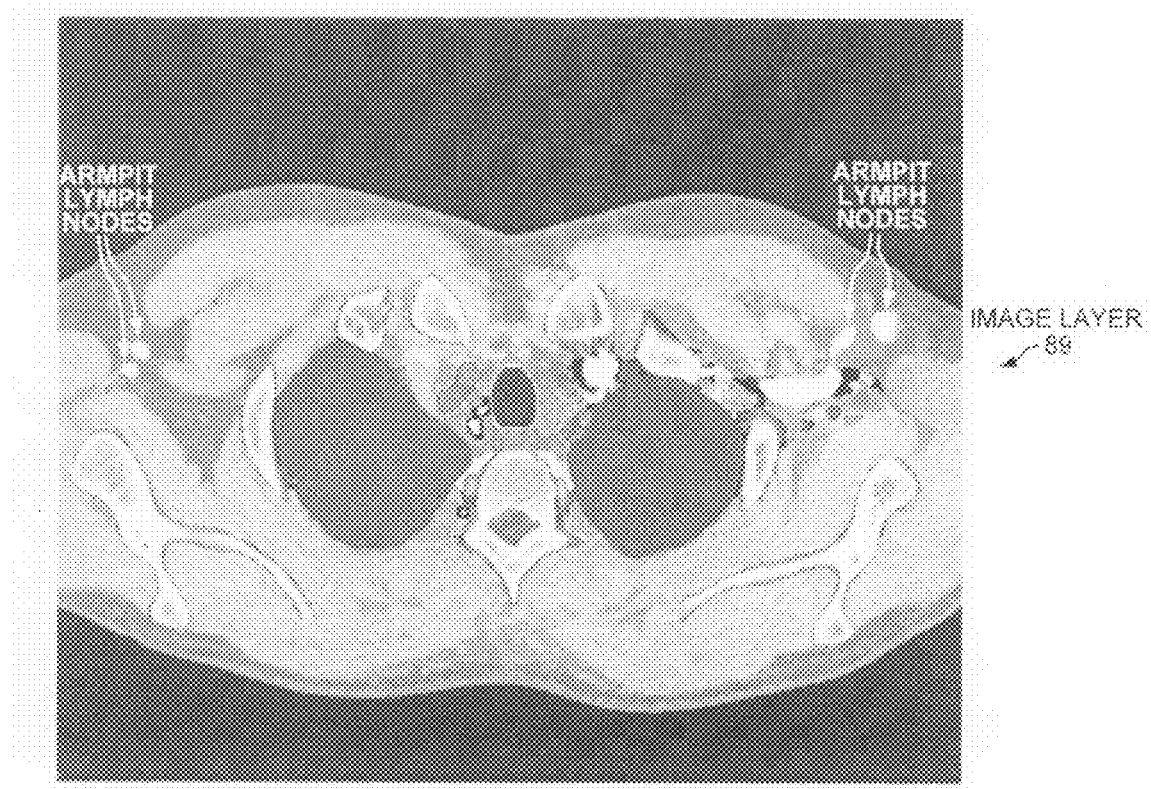
FIG. 17 is an image layer in which the armpit lymph nodes have been detected using the brightness threshold determined in FIG. 15 and the lungs as context objects.
Figure 18:
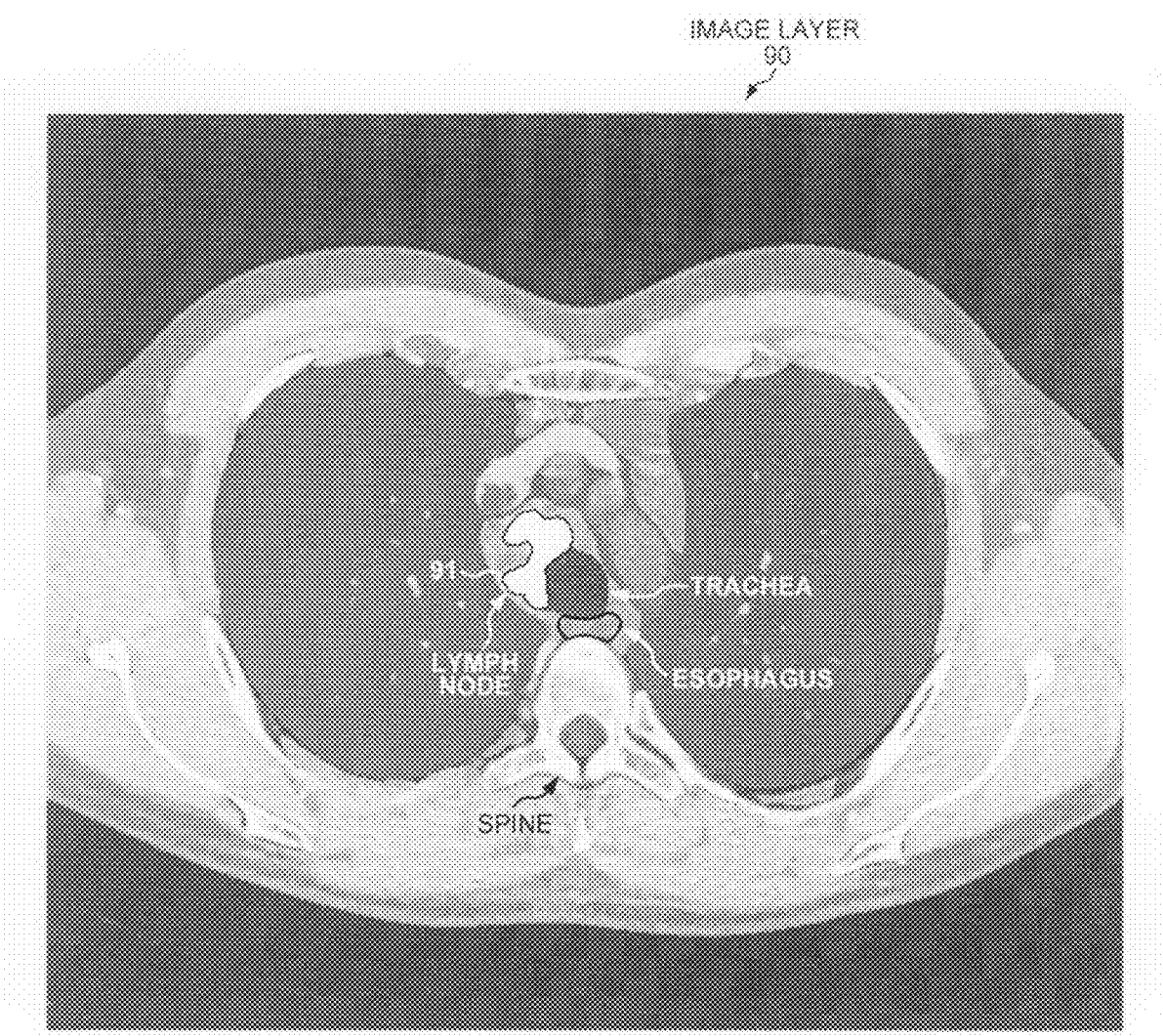
FIG. 18 is an image layer in which a detected lymph node is indicated by an outline superimposed over the originally acquired digital image slice.

In a process step 74, the lymph nodes are detected. First, the muscles located underneath the subcutaneous fat and the other detected organs are excluded from being classified as lymph nodes. FIG. 16 shows an image layer. 88 in which candidate objects for lymph nodes have been found. Then the esophagus is detected as being between the trachea and the spinal cord. The esophagus is also excluded from being classified as a lymph node. The armpit lymph nodes are detected using the lungs as well as the general body outline as context objects. In addition, a volume limit and a brightness threshold are used to detect lymph nodes. For example, the membership function for the armpit lymph nodes excludes candidate objects whose pixel values are not brighter than the threshold determined in sub-process step 82. Moreover, candidate objects whose volume is greater than a predetermined maximum are also excluded from belonging to the class "armpit lymph nodes". FIG. 17 shows an image layer 89 in which armpit lymph nodes have been detected. FIG. 18 shows an image layer 90 in which a lymph node has been detected near the trachea. In the embodiment shown in FIG. 18, the detected lymph node is indicated by an outline 91 that is superimposed over the digital image slice originally acquired by the detection and analysis system. The membership function for the class "lymph nodes" 27 uses the spine and aorta as context objects. In process step 74, candidate objects located behind the spine are excluded from the class "lymph nodes" 27. In addition, candidate objects have a higher probability of being classified as lymph nodes then they are located in the vicinity of the aorta. In FIG. 18, the detection and analysis system has also detected the esophagus between the trachea and the spine.

Figure 19:
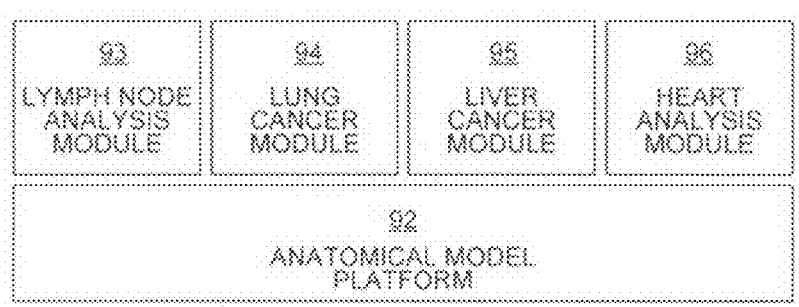
FIG. 19 is a diagram of the structure of the Cognition Program in which specialty modules run on an anatomical model platform.

FIG. 19 is a diagram of the structure of the Cognition Program. The Cognition Program is organized in modules. In one embodiment, the Cognition Program is based on an anatomical model platform 92. Anatomical model platform 92 generates a basic anatomical model using the digital image slices taken of a patient. Then a specialty module analyzes a particular topic in more detail. The platform and the modules are written in the programming language C++. Each specialty module can operate without the presence of the other specialty modules. The specialty modules all run on anatomical model platform 92. For example, a lymph node analysis module 93 performs more detailed measurements and analysis of the lymph nodes detected by anatomical model platform 92. For example, lymph node analysis module 93 determines whether a lymph node is swollen and thereby detects whether the lymph node is cancerous. Other specialty modules include a lung cancer module 94, a liver cancer module 95 and a heart analysis module 96. For example, specialty modules directed to cancer diagnosis are specially adapted to measure properties of tumors and cancerous regions in lymph nodes, lungs, liver, colon or brain.

The detection and analysis system can also generate anatomical models of animals. In one embodiment, heart analysis module 96 is applied to digital image slices of a mouse. Digital image slices of a mouse's heart are acquired over time using magnetic resonance imaging (MRI). Heart analysis module 96 then analyzes the blood volume flowing through the ventricle and the wall thickness of the ventricle.

Class network 13 and process hierarchy 14 can be edited without recompiling the Cognition Program because class network 13 and process hierarchy 14 are specified using a Cognition Language (CL) based on the XML script language. Although the Cognition Program executes the CL scripts that specify the class network and process hierarchy, the CL scripts are stored only as XML code. At run time, the CL scripts are translated into a series of C++ function calls. Thus, the CL scripts are interpreted at run time. After a CL script has been executed, a CL file storage mechanism translates the CL data structures into XML and saves the XML code to a file or database. The CL scripts are stored in C++ data structures in the memory of the computer that implements computer-implemented network structure 11. Before the Cognition Program can run a CL script, the CL data structures are recreated from the stored XML files.

The user then inputs a new membership function of a new class at run time that defines whether the objects of data network 12 will belong to the new class, and the process steps can be performed immediately on the newly generated data network 12 without recompiling the program instructions of the Cognition Program. The XML-based Cognition Language and the graphical user interface allow the user more quickly to "train" network structure 11 to generate an anatomical model. The ability to edit class network 13 and process hierarchy 14 at run time differentiates the Cognition Program from conventional CAD schemes that cannot change the process of applying rules once the CAD scheme begins analyzing a particular digital image slice. For example, after a research doctor determines that the results of the pattern recognition performed on digital image slices of one body type are satisfactory, the process steps are executed on digital image slices of the next control patient. The Cognition Program would typically not be run in the interactive mode when the user is a clinical doctor who is generating an anatomical model for a particular patient. A clinical doctor would use the Cognition Program with a class network and a process hierarchy that have already been trained by the research doctor. In that case, all of the process steps of process hierarchy 14 would be executed on the digital image slices of the patient, and the results would be saved for displaying as the final results in process step 74, as shown in FIGS. 17 and 18.

The detection and analysis system can also be used to track movement over time. Digital images are taken of the same slice of a body at various time intervals. Movement can be tracked by linking objects of the same class that are obtained from digital image slices taken in adjacent time intervals. For example, the growth of a tumor or the expansion of a prostate gland can be measured over time. Measuring the change in size and shape of organs and other anatomical objects can be used to assess the effectiveness of a therapy.

FIG. 20 is a listing of high-level lines of XML code that corresponds to a CL script that implements a class network and a process hierarchy for detecting and analyzing lymph nodes. The CL script was created and edited using a graphical user interface similar to the one shown in FIGS. 6-9. All of the lines of the XML code are present in a text tile entitled Lymph-Nodes-MM.txt that was generated from the corresponding XML file. The Lymph-Nodes-MM.txt file is contained in the CD Appendix.

FIGS. 21A-E show more lines of the XML code of FIG. 20. The XML description of selected classes of FIG. 2 and process steps of FIG. 10 are identified by XML comments in figures 10A-E. For example, FIG. 21A shows the XML code 97 for the sub-process steps for applying the Gauss, Median and Edge filters shown in the window labeled "Process Tree" in FIG. 7. FIG. 21A also shows a process step 98 for classifying intermediate objects as "fragments" and then modifying and combining those fragments to generate anatomical objects. Process step 98 corresponds to the process step 62 shown in the screenshot of FIG. 8. FIG. 20B shows XML descriptions 99 of process steps that correspond to sub-process step 82 of FIG. 10 used to detect the spine.

Compact Disc Appendix

The Compact Disc contains:

A) the file named Identification-of-LymphNodes.txt (20,660 KB, written to disc on May 25, 2007) which is an ASCII version of XML code that generates an anatomical model used to analyze lymph nodes;

B) the file named Lymph-Nodes-MM.txt (6,054 KB, written to disc on May 25, 2007) which is an ASCII version of the XML representation shown in part in FIGS. 20-21; and C) a file named CD Appendix Title Page.txt, which has 269 bytes and was written to disc on May 25, 2007.

Although the present invention has been described in connection with certain specific embodiments for instructional purposes, the present invention is not limited thereto. For example, although embodiments of the Cognition Program and computer-implemented network structure have been described above in relation to the computer-aided detection of human organs that comprise an anatomical model of a patient, the Cognition Program and network structure can equally be applied to detecting and analyzing anatomical objects in animals. Accordingly, various modifications, adaptations, and combinations of various features of the described embodiments can be practiced without departing from the scope of the invention as set forth in the claims.

What is claimed is:

1. A method comprising: specifying a first class of a class network, wherein the first class is associated with a first anatomical object;

specifying a second class of the class network, wherein the second class is associated with a second anatomical object, and wherein the second class is specified according to a relation between objects in the second class and objects in the first class;

specifying a process hierarchy, wherein the process hierarchy includes a first process step and a second process step;

performing the first process step to detect the first anatomical object using the first class, wherein the first process step is implemented on a computer of an image detection system;

performing the second process step to detect the second anatomical object using the second class, wherein the second process step detects the second anatomical object using the detection of the first anatomical object; and measuring the second anatomical object, wherein the measuring the second anatomical object measures a shape of the sub-object, and wherein the shape is measured using a bounding box having x, y, and z dimensions;

performing the third process step to detect a sub-object within the second anatomical object; and measuring the sub-object.

2. A computer-implemented network structure, comprising: a data network including a first voxel value, a second voxel value, a first link, a second link, a first object and a second object, wherein the first voxel value and the second voxel value are part of a digital image slice of a human body, wherein the first link links the first voxel value to the first object, and wherein the second link links the second voxel value to the second object;

a class network including a first class and a second class; and a process hierarchy stored on a computer-readable medium including a first process step and a second process step, wherein the first process step determines that the first object belongs to the first class, wherein the second process step determines that the second object belongs to the second class based on a relation between the second object and the first object, wherein the first process step is performed by a computer of an image detection system before the second process step is performed, wherein the second process step has an algorithm, and wherein the algorithm measures a property of second;

wherein the relation between the second object and the first object is a spatial relation.

3. A system comprising:
a display on which a digital image of a cross section of a human body is displayed; and
means for generating an anatomical model of the human body, wherein the anatomical model includes a first organ and a second organ, wherein the means identifies the first organ in the digital image, and wherein the means identifies the second organ based on the identification of the first organ.

4. The system of claim 3, wherein the means displays an indication of the second organ on the display.

5. The system of claim 3, wherein the first organ is a liver, and wherein the second organ is a lymph node.

6. A method comprising:
specifying a first class of a class network;
specifying a second class of the class network;
specifying a third class of the class network, wherein objects of an object network are classified by a first membership function as belonging to the first class, wherein objects of the object network are classified by a second membership function as belonging to the second class, and wherein the first class is associated with a first human organ, the second class is associated with a second human organ, and the third class is associated with a third human organ, specifying a process hierarchy, wherein the process hierarchy includes a first process step, a second process step and a third process step;

performing the first process step to detect the first human organ using the first membership function, wherein the first process step is implemented on a computer of an image detection system;

performing the second process step to detect the second human organ using the second membership function; and performing the third process step to detect the third human organ using the third membership function, wherein the third membership function classifies objects of the object network as belonging to the third class based on either a first relation between objects in the third class and objects in the first class or based on a second relation between objects in the third class and objects in the second class, and wherein the third membership function classifies objects based on the second relation when the second membership function determines a better fit for the objects classified as belonging to the second class than a fit determined by the first membership function for the objects classified as belonging to the first class.

7. The method of claim 6, further comprising:
acquiring a digital image slice;
superimposing an indication of the third human organ on the digital image slice; and
displaying the indication of the third human organ on a display.

8. The method of claim 7, wherein the digital image slice is one of a plurality of digital image slices that make up a three-dimensional dataset of voxels.

9. The method of claim 6, wherein the first human organ is an aorta and the second human organ is a spine.

* * * * *